US012695573B2

(12) United States Patent
Elshafie et al.

(10) Patent No.: US 12,695,573 B2
(45) Date of Patent: Jul. 28, 2026

(54) BUNDLING SLOTS IN ACCORDANCE WITH A DEMODULATION REFERENCE SIGNAL (DMRS)-SHARING POWER CONTROL CONFIGURATION

(71) Applicant: QUALCOMM Incorporated, San Diego, CA (US)

(72) Inventors: Ahmed Elshafie, San Diego, CA (US); Alexandros Manolakos, Athens (GR); Ahmed Attia Abotabl, San Diego, CA (US); Muhammad Sayed Khairy Abdelghaffar, San Jose, CA (US); Hung Dinh Ly, San Diego, CA (US); Abdelrahman Mohamed Ahmed Mohamed Ibrahim, San Diego, CA (US); Krishna Kiran Mukkavilli, San Diego, CA (US); Tingfang Ji, San Diego, CA (US)

( * ) Notice: Subject to any disclaimer, the term of this patent is extended or adjusted under 35 U.S.C. 154(b) by 303 days.

(21) Appl. No.: 18/694,257

(22) PCT Filed: Oct. 18, 2022

(86) PCT No.: PCT/US2022/078285
§ 371 (c)(1),
(2) Date: Mar. 21, 2024

(87) PCT Pub. No.: WO2023/086721
PCT Pub. Date: May 19, 2023

(65) Prior Publication Data
US 2024/0430060 A1 Dec. 26, 2024

(30) Foreign Application Priority Data
Nov. 15, 2021 (GR) ............................... 20210100799

(51) Int. Cl.
 *H04L 5/00* (2006.01)
 *H04L 5/14* (2006.01)
 (Continued)

(52) U.S. Cl.
 CPC .......... *H04L 5/0051* (2013.01); *H04L 5/1423* (2013.01); *H04L 5/1469* (2013.01); *H04W 52/146* (2013.01); *H04W 52/38* (2013.01)

(58) Field of Classification Search
 CPC .. H04W 52/146; H04W 52/38; H04L 5/0051; H04L 5/1423; H04L 5/1469
 See application file for complete search history.

(56) References Cited

U.S. PATENT DOCUMENTS 9,622,186 B2 * 4/2017 Park ..................... H04W 52/243
2014/0105141 A1 * 4/2014 Noh ......................... H04L 5/001
 370/329
 (Continued)

OTHER PUBLICATIONS

Huawei, et al., "Discussion on Joint Channel Estimation for PUSCH", 3GPP TSG RAN WG1 Meeting #104-e, R1-2100233, 3rd Generation Partnership Project (3GPP), Mobile Competence Centre, 650, Route Des Lucioles, F-06921, Sophia-Antipolis Cedex, France, Jan. 25, 2021-Feb. 5, 2021, Jan. 19, 2021, XP051970865, 4 Pages, Section 2.1.
 (Continued)

*Primary Examiner* — Dominic E Rego

(57) ABSTRACT

Disclosed are techniques for wireless communication. In an aspect, one or more slots in a set of DMRS-bundled slots are excluded from a DMRS-sharing power control configuration based on duplex-type. In another aspect, a fixed transmission power level for a DMRS-sharing power control configuration is based at least in part upon a duplex configuration of DMRS-bundled slots.

30 Claims, 25 Drawing Sheets

(51) Int. Cl.
    *H04W 52/14*         (2009.01)
    *H04W 52/38*         (2009.01)

(56)             References Cited

U.S. PATENT DOCUMENTS

| | | | | |
|---|---|---|---|---|
| 2017/0187479 | A1* | 6/2017 | Yamamoto | H04J 3/0638 |
| 2017/0366377 | A1* | 12/2017 | Papasakellariou | H04L 5/005 |
| 2019/0028252 | A1* | 1/2019 | Akkarakaran | H04J 11/0023 |
| 2019/0052424 | A1* | 2/2019 | Manolakos | H04W 72/23 |
| 2020/0136690 | A1* | 4/2020 | Noh | H04L 5/0094 |
| 2020/0228196 | A1* | 7/2020 | John Wilson | H04W 72/23 |
| 2020/0229112 | A1 | 7/2020 | John Wilson et al. | |
| 2021/0321404 | A1 | 10/2021 | Manolakos et al. | |
| 2022/0045816 | A1* | 2/2022 | Suzuki | H04L 5/0051 |
| 2022/0183017 | A1* | 6/2022 | Wu | H04W 52/383 |
| 2022/0416978 | A1* | 12/2022 | Kalbasi | H04L 5/0053 |
| 2023/0014238 | A1* | 1/2023 | Pocovi | H04W 72/1263 |
| 2023/0291523 | A1* | 9/2023 | Hasegawa | H04W 52/281 |

OTHER PUBLICATIONS

International Search Report and Written Opinion—PCT/US2022/078285—ISA/EPO—Mar. 14, 2023.
Partial International Search Report—PCT/US2022/078285—ISA/EPO—Jan. 20, 2023.

* cited by examiner

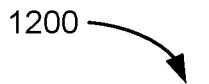
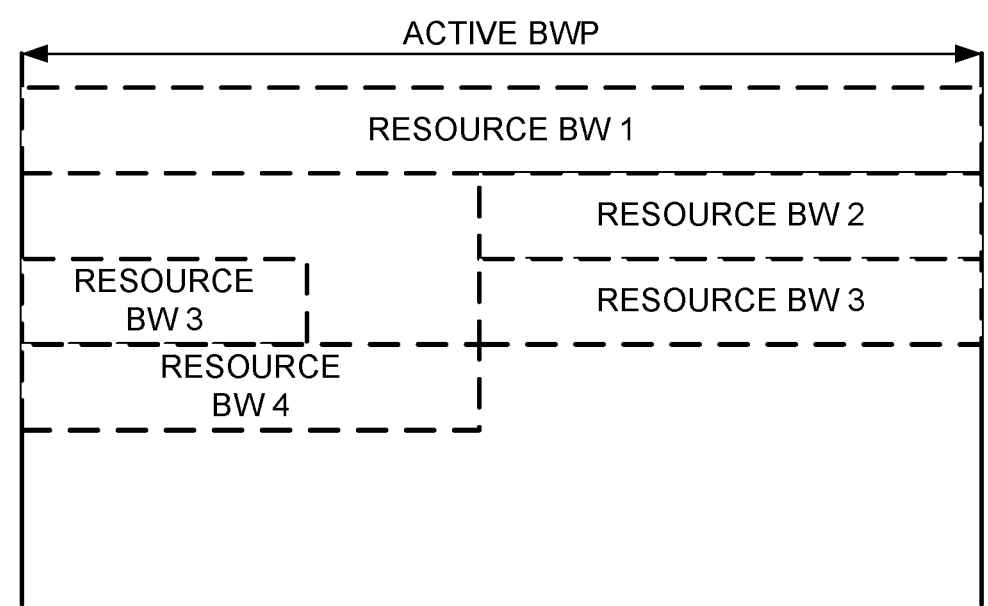
*FIG. 12*

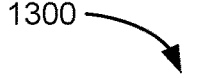
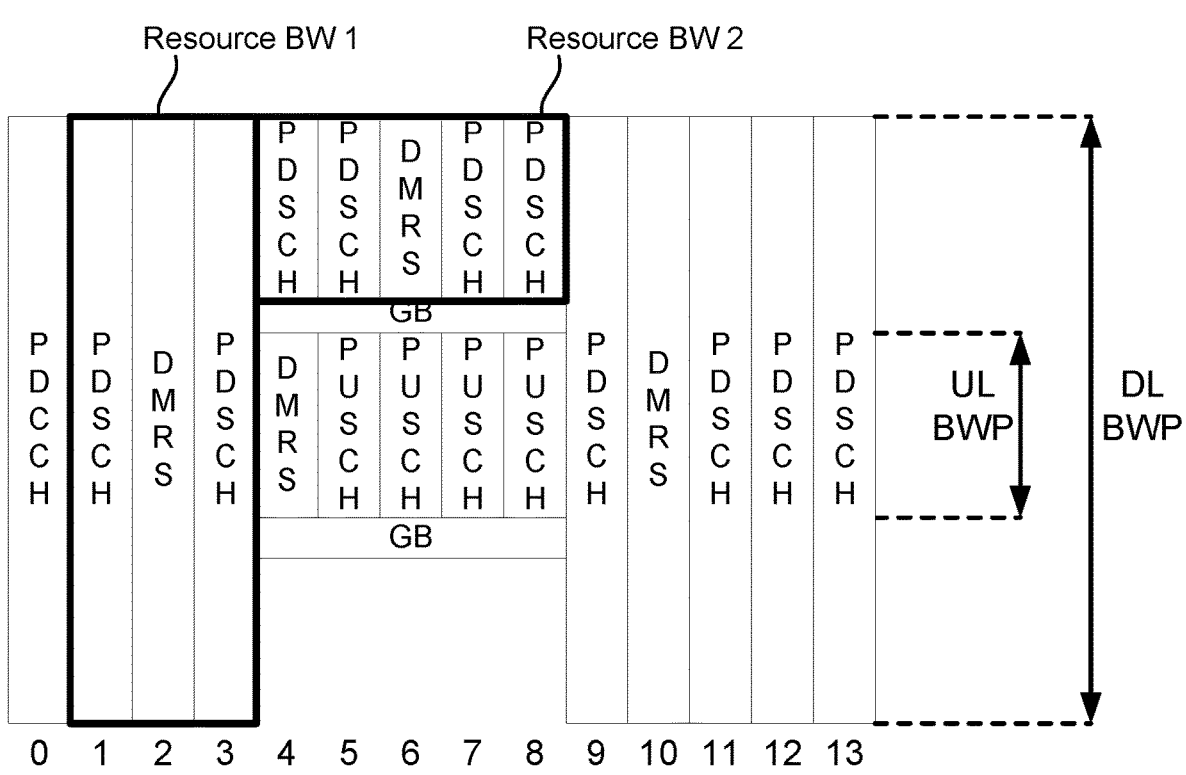
*FIG. 13*

Figure 16:
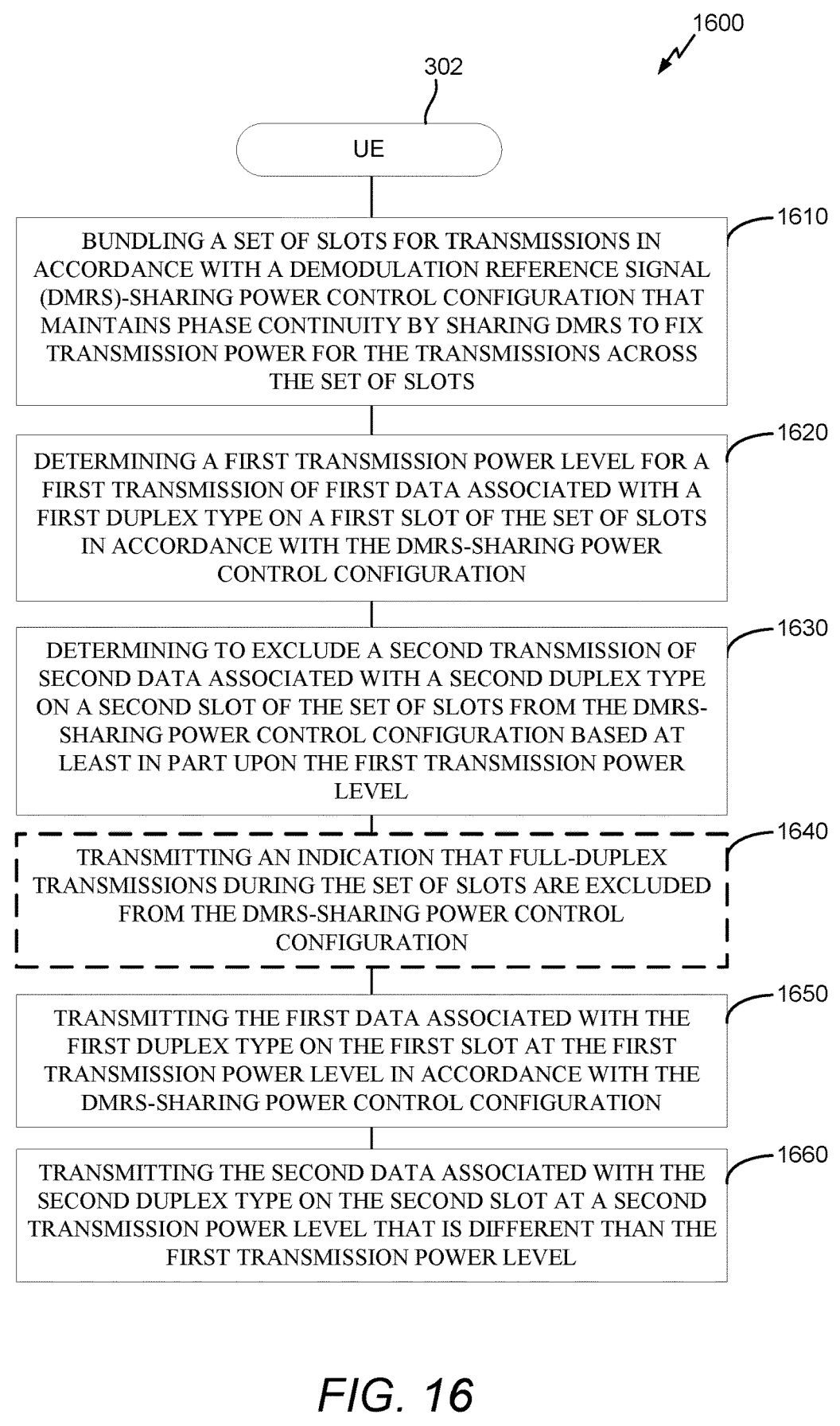

1600

302

UE

BUNDLING A SET OF SLOTS FOR TRANSMISSIONS IN ACCORDANCE WITH A DEMODULATION REFERENCE SIGNAL (DMRS)-SHARING POWER CONTROL CONFIGURATION THAT MAINTAINS PHASE CONTINUITY BY SHARING DMRS TO FIX TRANSMISSION POWER FOR THE TRANSMISSIONS ACROSS THE SET OF SLOTS

1610

DETERMINING A FIRST TRANSMISSION POWER LEVEL FOR A FIRST TRANSMISSION OF FIRST DATA ASSOCIATED WITH A FIRST DUPLEX TYPE ON A FIRST SLOT OF THE SET OF SLOTS IN ACCORDANCE WITH THE DMRS-SHARING POWER CONTROL CONFIGURATION

1620

DETERMINING TO EXCLUDE A SECOND TRANSMISSION OF SECOND DATA ASSOCIATED WITH A SECOND DUPLEX TYPE ON A SECOND SLOT OF THE SET OF SLOTS FROM THE DMRS-SHARING POWER CONTROL CONFIGURATION BASED AT LEAST IN PART UPON THE FIRST TRANSMISSION POWER LEVEL

1630

TRANSMITTING AN INDICATION THAT FULL-DUPLEX TRANSMISSIONS DURING THE SET OF SLOTS ARE EXCLUDED FROM THE DMRS-SHARING POWER CONTROL CONFIGURATION

1640

TRANSMITTING THE FIRST DATA ASSOCIATED WITH THE FIRST DUPLEX TYPE ON THE FIRST SLOT AT THE FIRST TRANSMISSION POWER LEVEL IN ACCORDANCE WITH THE DMRS-SHARING POWER CONTROL CONFIGURATION

1650

TRANSMITTING THE SECOND DATA ASSOCIATED WITH THE SECOND DUPLEX TYPE ON THE SECOND SLOT AT A SECOND TRANSMISSION POWER LEVEL THAT IS DIFFERENT THAN THE FIRST TRANSMISSION POWER LEVEL

Figure 17:
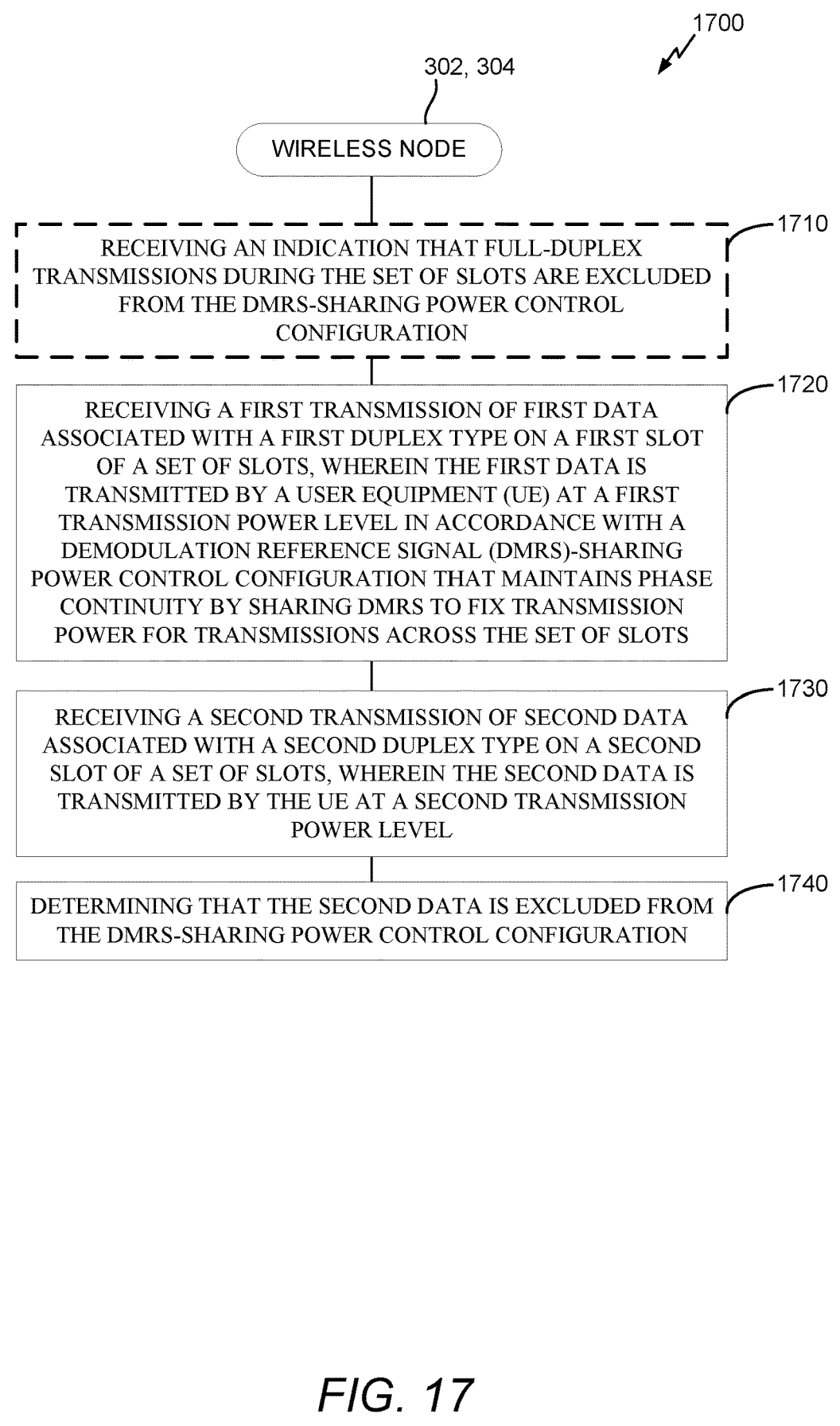

( WIRELESS NODE )

┌─────────────────────────────────────────────────────┐ ⌐1710
│     RECEIVING AN INDICATION THAT FULL-DUPLEX         │
│ TRANSMISSIONS DURING THE SET OF SLOTS ARE EXCLUDED   │
│     FROM THE DMRS-SHARING POWER CONTROL              │
│              CONFIGURATION                           │
└─────────────────────────────────────────────────────┘

┌─────────────────────────────────────────────────────┐ ⌐1720
│      RECEIVING A FIRST TRANSMISSION OF FIRST DATA    │
│   ASSOCIATED WITH A FIRST DUPLEX TYPE ON A FIRST SLOT│
│    OF A SET OF SLOTS, WHEREIN THE FIRST DATA IS      │
│   TRANSMITTED BY A USER EQUIPMENT (UE) AT A FIRST    │
│   TRANSMISSION POWER LEVEL IN ACCORDANCE WITH A      │
│   DEMODULATION REFERENCE SIGNAL (DMRS)-SHARING       │
│ POWER CONTROL CONFIGURATION THAT MAINTAINS PHASE     │
│  CONTINUITY BY SHARING DMRS TO FIX TRANSMISSION      │
│  POWER FOR TRANSMISSIONS ACROSS THE SET OF SLOTS     │
└─────────────────────────────────────────────────────┘

┌─────────────────────────────────────────────────────┐ ⌐1730
│    RECEIVING A SECOND TRANSMISSION OF SECOND DATA    │
│  ASSOCIATED WITH A SECOND DUPLEX TYPE ON A SECOND    │
│  SLOT OF A SET OF SLOTS, WHEREIN THE SECOND DATA IS  │
│   TRANSMITTED BY THE UE AT A SECOND TRANSMISSION     │
│                POWER LEVEL                           │
└─────────────────────────────────────────────────────┘

┌─────────────────────────────────────────────────────┐ ⌐1740
│ DETERMINING THAT THE SECOND DATA IS EXCLUDED FROM    │
│   THE DMRS-SHARING POWER CONTROL CONFIGURATION       │
└─────────────────────────────────────────────────────┘

Figure 18:
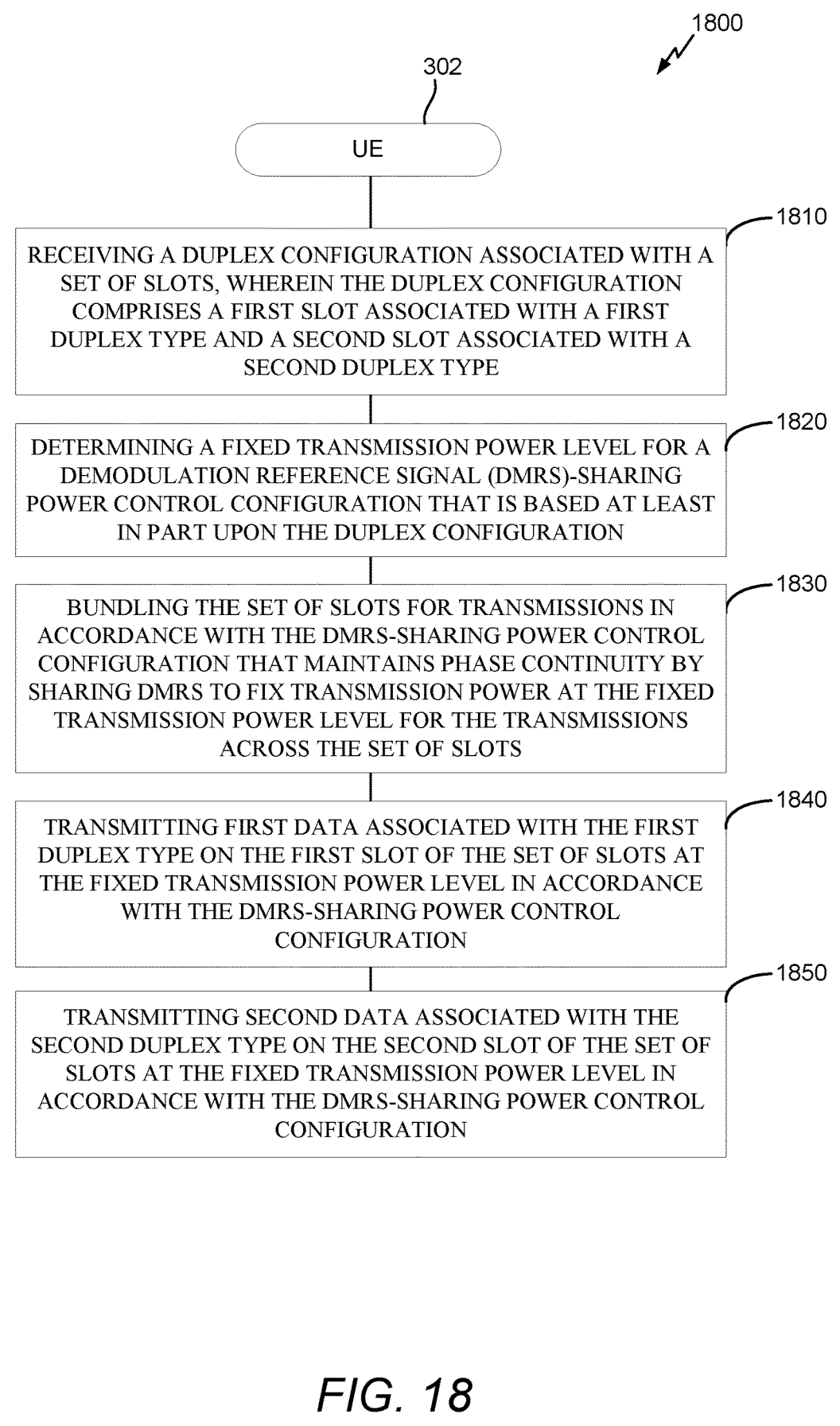

RECEIVING A DUPLEX CONFIGURATION ASSOCIATED WITH A SET OF SLOTS, WHEREIN THE DUPLEX CONFIGURATION COMPRISES A FIRST SLOT ASSOCIATED WITH A FIRST DUPLEX TYPE AND A SECOND SLOT ASSOCIATED WITH A SECOND DUPLEX TYPE

1820

DETERMINING A FIXED TRANSMISSION POWER LEVEL FOR A DEMODULATION REFERENCE SIGNAL (DMRS)-SHARING POWER CONTROL CONFIGURATION THAT IS BASED AT LEAST IN PART UPON THE DUPLEX CONFIGURATION

1830

BUNDLING THE SET OF SLOTS FOR TRANSMISSIONS IN ACCORDANCE WITH THE DMRS-SHARING POWER CONTROL CONFIGURATION THAT MAINTAINS PHASE CONTINUITY BY SHARING DMRS TO FIX TRANSMISSION POWER AT THE FIXED TRANSMISSION POWER LEVEL FOR THE TRANSMISSIONS ACROSS THE SET OF SLOTS

1840

TRANSMITTING FIRST DATA ASSOCIATED WITH THE FIRST DUPLEX TYPE ON THE FIRST SLOT OF THE SET OF SLOTS AT THE FIXED TRANSMISSION POWER LEVEL IN ACCORDANCE WITH THE DMRS-SHARING POWER CONTROL CONFIGURATION

1850

TRANSMITTING SECOND DATA ASSOCIATED WITH THE SECOND DUPLEX TYPE ON THE SECOND SLOT OF THE SET OF SLOTS AT THE FIXED TRANSMISSION POWER LEVEL IN ACCORDANCE WITH THE DMRS-SHARING POWER CONTROL CONFIGURATION

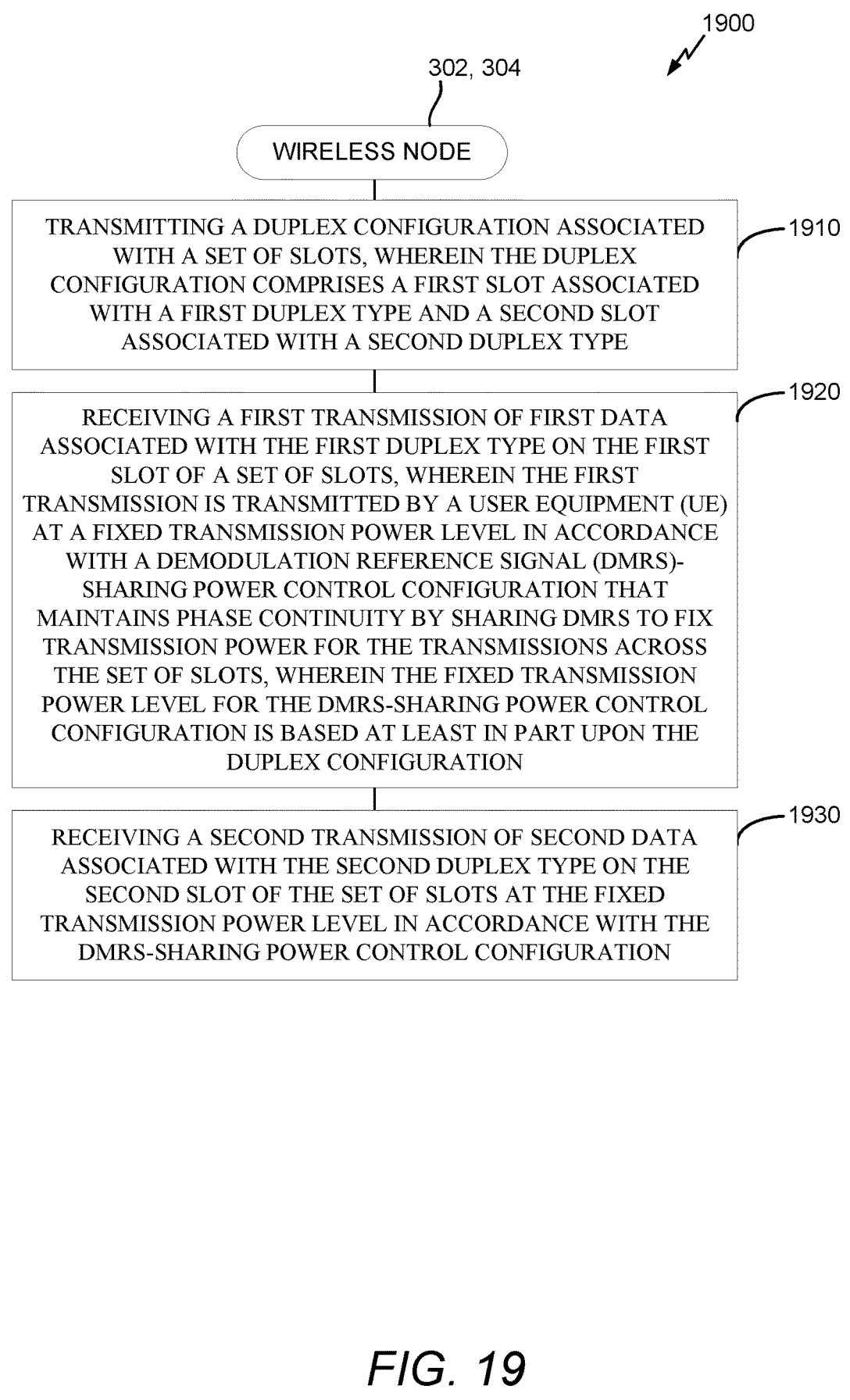

WIRELESS NODE

TRANSMITTING A DUPLEX CONFIGURATION ASSOCIATED WITH A SET OF SLOTS, WHEREIN THE DUPLEX CONFIGURATION COMPRISES A FIRST SLOT ASSOCIATED WITH A FIRST DUPLEX TYPE AND A SECOND SLOT ASSOCIATED WITH A SECOND DUPLEX TYPE — 1910

RECEIVING A FIRST TRANSMISSION OF FIRST DATA ASSOCIATED WITH THE FIRST DUPLEX TYPE ON THE FIRST SLOT OF A SET OF SLOTS, WHEREIN THE FIRST TRANSMISSION IS TRANSMITTED BY A USER EQUIPMENT (UE) AT A FIXED TRANSMISSION POWER LEVEL IN ACCORDANCE WITH A DEMODULATION REFERENCE SIGNAL (DMRS)-SHARING POWER CONTROL CONFIGURATION THAT MAINTAINS PHASE CONTINUITY BY SHARING DMRS TO FIX TRANSMISSION POWER FOR THE TRANSMISSIONS ACROSS THE SET OF SLOTS, WHEREIN THE FIXED TRANSMISSION POWER LEVEL FOR THE DMRS-SHARING POWER CONTROL CONFIGURATION IS BASED AT LEAST IN PART UPON THE DUPLEX CONFIGURATION — 1920

RECEIVING A SECOND TRANSMISSION OF SECOND DATA ASSOCIATED WITH THE SECOND DUPLEX TYPE ON THE SECOND SLOT OF THE SET OF SLOTS AT THE FIXED TRANSMISSION POWER LEVEL IN ACCORDANCE WITH THE DMRS-SHARING POWER CONTROL CONFIGURATION — 1930

*FIG. 19*

BUNDLING SLOTS IN ACCORDANCE WITH A DEMODULATION REFERENCE SIGNAL (DMRS)-SHARING POWER CONTROL CONFIGURATION

CROSS-REFERENCE TO RELATED APPLICATIONS

The present Application for Patent claims priority to Greek patent application Ser. No. 20/210,100799, entitled "BUNDLING SLOTS IN ACCORDANCE WITH A DEMODULATION REFERENCE SIGNAL (DMRS)-SHARING POWER CONTROL CONFIGURATION," filed Nov. 15, 2021, and is a national stage application, filed under 35 U.S.C. § 371, of International Patent Application No. PCT/US2022/078285, entitled "BUNDLING SLOTS IN ACCORDANCE WITH A DEMODULATION REFER-ENCE SIGNAL (DMRS)-SHARING POWER CONTROL CONFIGURATION," filed Oct. 18, 2022, both of which are assigned to the assignee hereof and expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digi-tal wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless com-munication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to pro-vide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some designs, demodulation reference signal (DMRSs) in three multiple slots may be 'bundled' together. In this case, the receiver performs joint channel estimation on the DMRS in multiple time slots for multiple UL transmissions (PUSCH or PUCCH) to improve the accuracy of channel estimation and enhance coverage. For DMRS bundling, the transmitter may be required to maintain phase continuity across the multiple UL transmissions in the respective slots. Various conditions for maintaining phase continuity on the multiple UL transmissions may be utilized, such as main-taining the same frequency resource allocation, the same transmission power, the same spatial transmission relation, the same antenna ports, the same precoding, etc.

In DMRS bundling, a UE will typically set a transmission power level based on the first slot within a DMRS bundle. That is, a window of DMRS bundling could start, then based on first slot power control, the UE has to maintain the same transmission power level to maintain phase continuity. How-ever, this transmission power level may not be suitable for some or all of the other slots being bundled. For example, a transmission power level established for an HD slot is typically higher than a transmission power level established for an FD slot. Hence, if the first slot is an HD slot, the transmission power level for the DMRS-bundled slots may be too high for FD slot(s) (e.g., high self-interference). Alternatively, if the first slot is an FD slot, the transmission power level for the DMRS-bundled slots may be too low for HD slot(s).

Aspects of the disclosure relate to selective exclusion of slot(s) from bundling in a DMRS-sharing power control configuration based at least in part upon duplex type (e.g., FD or HD). Such aspects may provide various technical advantages, such as facilitating a more suitable transmission power level for the excluded slot(s), which may improve communication (e.g., reducing self-interference, ensuring that sufficient transmission power is used, etc.). In some designs, such aspects may be implemented in a multiple DCI scenario (e.g., a first DCI indicates the set of slots for DMRS bundling, and a second DCI indicates the duplex configu-ration for the individual slots).

Moreover, in some legacy systems, a fixed transmission power level is set for DMRS-bundled slots based only on the initial slot, without regard to the duplex configuration of the set for DMRS-bundled slots. Additional aspects of the disclosure relate to establishment of a fixed transmission power level for a DMRS-sharing power control configura-tion based at least in part upon a duplex configuration (e.g., FD or HD) of the DMRS-bundled slots. Such aspects may provide various technical advantages, such as facilitating a more suitable transmission power level for the entire set of DMRS-bundled slots, which may improve communication (e.g., reducing self-interference, ensuring that sufficient transmission power is used, etc.). In some designs, such aspects may be implemented in a single DCI scenario (e.g., a single DCI indicates the set of slots for DMRS bundling, as well as the duplex configuration for the individual slots).

In an aspect, a method of operating a user equipment (UE) includes bundling a set of slots for transmissions in accor-dance with a demodulation reference signal (DMRS)-shar-ing power control configuration that maintains phase continuity by sharing DMRS to fix transmission power for the transmissions across the set of slots; determining a first transmission power level for a first transmission of first data associated with a first duplex type on a first slot of the set of slots in accordance with the DMRS-sharing power control configuration; determining to exclude a second transmission of second data associated with a second duplex type on a second slot of the set of slots from the DMRS-sharing power control configuration based at least in part upon the first transmission power level; transmitting the first data associated with the first duplex type on the first slot at the first transmission power level in accordance with the DMRS-sharing power control configuration; and transmitting the second data associated with the second duplex type on the second slot at a second transmission power level that is different than the first transmission power level.

In an aspect, a method of operating a wireless node includes receiving a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots; receiving a second transmission of second data associated with a second duplex type on a second slot of a set of slots, wherein the second data is transmitted by the UE at a second transmission power level; and determining that the second data is excluded from the DMRS-sharing power control configuration.

In an aspect, a method of operating a user equipment (UE) includes receiving a duplex configuration associated with a set of slots, wherein the duplex configuration comprises a first slot associated with a first duplex type and a second slot associated with a second duplex type; determining a fixed transmission power level for a demodulation reference signal (DMRS)-sharing power control configuration that is based at least in part upon the duplex configuration; bundling the set of slots for transmissions in accordance with the DMRS-sharing power control configuration that maintains phase continuity by sharing DMRS to fix transmission power at the fixed transmission power level for the transmissions across the set of slots; transmitting first data associated with the first duplex type on the first slot of the set of slots at the fixed transmission power level in accordance with the DMRS-sharing power control configuration; and transmitting second data associated with the second duplex type on the second slot of the set of slots at the fixed transmission power level in accordance with the DMRS-sharing power control configuration.

In an aspect, a method of operating a wireless node includes transmitting a duplex configuration associated with a set of slots, wherein the duplex configuration comprises a first slot associated with a first duplex type and a second slot associated with a second duplex type; receiving a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration; and receiving a second transmission of second data associated with the second duplex type on the second slot of the set of slots at the fixed transmission power level in accordance with the DMRS-sharing power control configuration.

In an aspect, a user equipment (UE) includes a memory; at least one transceiver; and at least one processor communicatively coupled to the memory and the at least one transceiver, the at least one processor configured to: bundle a set of slots for transmissions in accordance with a demodulation reference signal (DMRS)-sharing power control configuration that maintains phase continuity by sharing DMRS to fix transmission power for the transmissions across the set of slots; determine a first transmission power level for a first transmission of first data associated with a first duplex type on a first slot of the set of slots in accordance with the DMRS-sharing power control configuration; determine to exclude a second transmission of second data associated with a second duplex type on a second slot of the set of slots from the DMRS-sharing power control configuration based at least in part upon the first transmission power level; transmit, via the at least one transceiver, the first data associated with the first duplex type on the first slot at the first transmission power level in accordance with the DMRS-sharing power control configuration; and transmit, via the at least one transceiver, the second data associated with the second duplex type on the second slot at a second transmission power level that is different than the first transmission power level.

In an aspect, a wireless node includes a memory; at least one transceiver; and at least one processor communicatively coupled to the memory and the at least one transceiver, the at least one processor configured to: receive, via the at least one transceiver, a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots; receive, via the at least one transceiver, a second transmission of second data associated with a second duplex type on a second slot of a set of slots, wherein the second data is transmitted by the UE at a second transmission power level; and determine that the second data is excluded from the DMRS-sharing power control configuration.

In an aspect, an UE includes a memory; at least one transceiver; and at least one processor communicatively coupled to the memory and the at least one transceiver, the at least one processor configured to: receive, via the at least one transceiver, a duplex configuration associated with a set of slots, wherein the duplex configuration comprises a first slot associated with a first duplex type and a second slot associated with a second duplex type; determine a fixed transmission power level for a demodulation reference signal (DMRS)-sharing power control configuration that is based at least in part upon the duplex configuration; bundle the set of slots for transmissions in accordance with the DMRS-sharing power control configuration that maintains phase continuity by sharing DMRS to fix transmission power at the fixed transmission power level for the transmissions across the set of slots; transmit, via the at least one transceiver, first data associated with the first duplex type on the first slot of the set of slots at the fixed transmission power level in accordance with the DMRS-sharing power control configuration; and transmit, via the at least one transceiver, second data associated with the second duplex type on the second slot of the set of slots at the fixed transmission power level in accordance with the DMRS-sharing power control configuration.

In an aspect, a wireless node includes a memory; at least one transceiver; and at least one processor communicatively coupled to the memory and the at least one transceiver, the at least one processor configured to: transmit, via the at least one transceiver, a duplex configuration associated with a set of slots, wherein the duplex configuration comprises a first slot associated with a first duplex type and a second slot associated with a second duplex type; receive, via the at least one transceiver, a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration; and receive, via the at least one transceiver, a second transmission of second data associated with the second duplex type on the second slot of the set of slots at the fixed transmission power level in accordance with the DMRS-sharing power control configuration.

In an aspect, a user equipment (UE) includes means for bundling a set of slots for transmissions in accordance with a demodulation reference signal (DMRS)-sharing power control configuration that maintains phase continuity by sharing DMRS to fix transmission power for the transmissions across the set of slots; means for determining a first transmission power level for a first transmission of first data associated with a first duplex type on a first slot of the set of slots in accordance with the DMRS-sharing power control configuration; means for determining to exclude a second transmission of second data associated with a second duplex type on a second slot of the set of slots from the DMRS-sharing power control configuration based at least in part upon the first transmission power level; means for transmitting the first data associated with the first duplex type on the first slot at the first transmission power level in accordance with the DMRS-sharing power control configuration; and means for transmitting the second data associated with the second duplex type on the second slot at a second transmission power level that is different than the first transmission power level.

In an aspect, a wireless node includes means for receiving a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots; means for receiving a second transmission of second data associated with a second duplex type on a second slot of a set of slots, wherein the second data is transmitted by the UE at a second transmission power level; and means for determining that the second data is excluded from the DMRS-sharing power control configuration.

In an aspect, an UE includes means for receiving a duplex configuration associated with a set of slots, wherein the duplex configuration comprises a first slot associated with a first duplex type and a second slot associated with a second duplex type; means for determining a fixed transmission power level for a demodulation reference signal (DMRS)-sharing power control configuration that is based at least in part upon the duplex configuration; means for bundling the set of slots for transmissions in accordance with the DMRS-sharing power control configuration that maintains phase continuity by sharing DMRS to fix transmission power at the fixed transmission power level for the transmissions across the set of slots; means for transmitting first data associated with the first duplex type on the first slot of the set of slots at the fixed transmission power level in accordance with the DMRS-sharing power control configuration; and means for transmitting second data associated with the second duplex type on the second slot of the set of slots at the fixed transmission power level in accordance with the DMRS-sharing power control configuration.

In an aspect, a wireless node includes means for transmitting a duplex configuration associated with a set of slots, wherein the duplex configuration comprises a first slot associated with a first duplex type and a second slot associated with a second duplex type; means for receiving a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration; and means for receiving a second transmission of second data associated with the second duplex type on the second slot of the set of slots at the fixed transmission power level in accordance with the DMRS-sharing power control configuration.

In an aspect, a non-transitory computer-readable medium storing computer-executable instructions that, when executed by a user equipment (UE), cause the UE to: bundle a set of slots for transmissions in accordance with a demodulation reference signal (DMRS)-sharing power control configuration that maintains phase continuity by sharing DMRS to fix transmission power for the transmissions across the set of slots; determine a first transmission power level for a first transmission of first data associated with a first duplex type on a first slot of the set of slots in accordance with the DMRS-sharing power control configuration; determine to exclude a second transmission of second data associated with a second duplex type on a second slot of the set of slots from the DMRS-sharing power control configuration based at least in part upon the first transmission power level; transmit the first data associated with the first duplex type on the first slot at the first transmission power level in accordance with the DMRS-sharing power control configuration; and transmit the second data associated with the second duplex type on the second slot at a second transmission power level that is different than the first transmission power level.

In an aspect, a non-transitory computer-readable medium storing computer-executable instructions that, when executed by a wireless node, cause the wireless node to: receive a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots; receive a second transmission of second data associated with a second duplex type on a second slot of a set of slots, wherein the second data is transmitted by the UE at a second transmission power level; and determine that the second data is excluded from the DMRS-sharing power control configuration.

In an aspect, a non-transitory computer-readable medium storing computer-executable instructions that, when executed by an UE, cause the UE to: receive a duplex configuration associated with a set of slots, wherein the duplex configuration comprises a first slot associated with a first duplex type and a second slot associated with a second duplex type; determine a fixed transmission power level for a demodulation reference signal (DMRS)-sharing power control configuration that is based at least in part upon the duplex configuration; bundle the set of slots for transmissions in accordance with the DMRS-sharing power control configuration that maintains phase continuity by sharing DMRS to fix transmission power at the fixed transmission power level for the transmissions across the set of slots; transmit first data associated with the first duplex type on the first slot of the set of slots at the fixed transmission power level in accordance with the DMRS-sharing power control configuration; and transmit second data associated with the second duplex type on the second slot of the set of slots at the fixed transmission power level in accordance with the DMRS-sharing power control configuration.

In an aspect, a non-transitory computer-readable medium storing computer-executable instructions that, when executed by a wireless node, cause the wireless node to: transmit a duplex configuration associated with a set of slots, wherein the duplex configuration comprises a first slot associated with a first duplex type and a second slot associated with a second duplex type; receive a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration; and receive a second transmission of second data associated with the second duplex type on the second slot of the set of slots at the fixed transmission power level in accordance with the DMRS-sharing power control configuration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 8 illustrates a slot configuration in accordance with aspects of the disclosure.

FIG. 10 illustrates an example resource allocation for a frequency division duplex (FDD) BS and one or more UEs in accordance with an aspect of the disclosure.

FIG. 12 illustrates Resource bandwidth (BW) configurations within an active BWP in accordance with aspects of the disclosure.

FIG. 13 illustrates a slot configuration in accordance with aspects of the disclosure.

FIG. 16 illustrates an exemplary process of wireless communication, according to aspects of the disclosure.

FIG. 17 illustrates an exemplary process of wireless communication, according to aspects of the disclosure.

FIG. 18 illustrates an exemplary process of wireless communication, according to aspects of the disclosure.

FIG. 19 illustrates an exemplary process of wireless communication, according to aspects of the disclosure.

DETAILED DESCRIPTION

Figure 1:
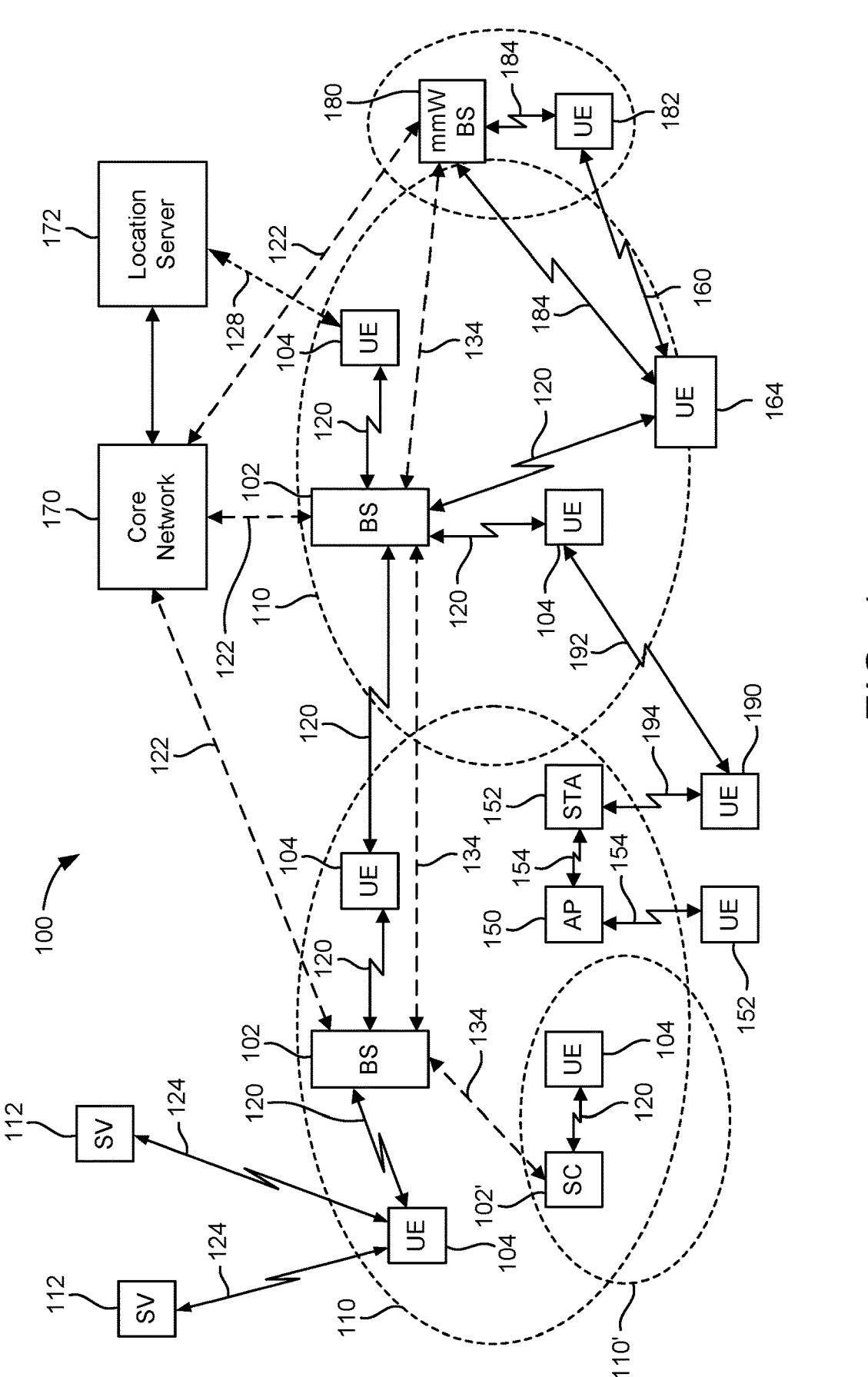
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL)

channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
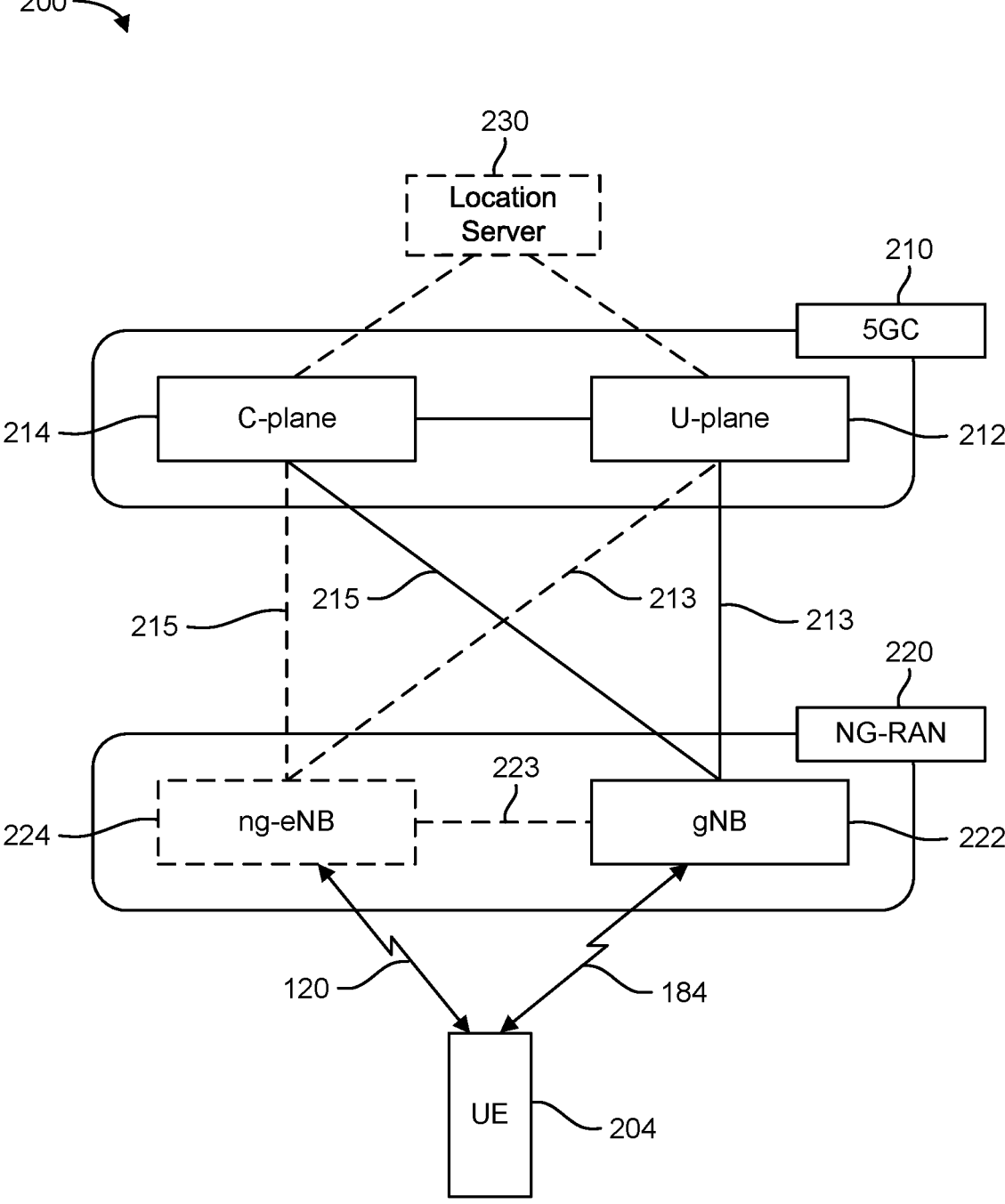
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
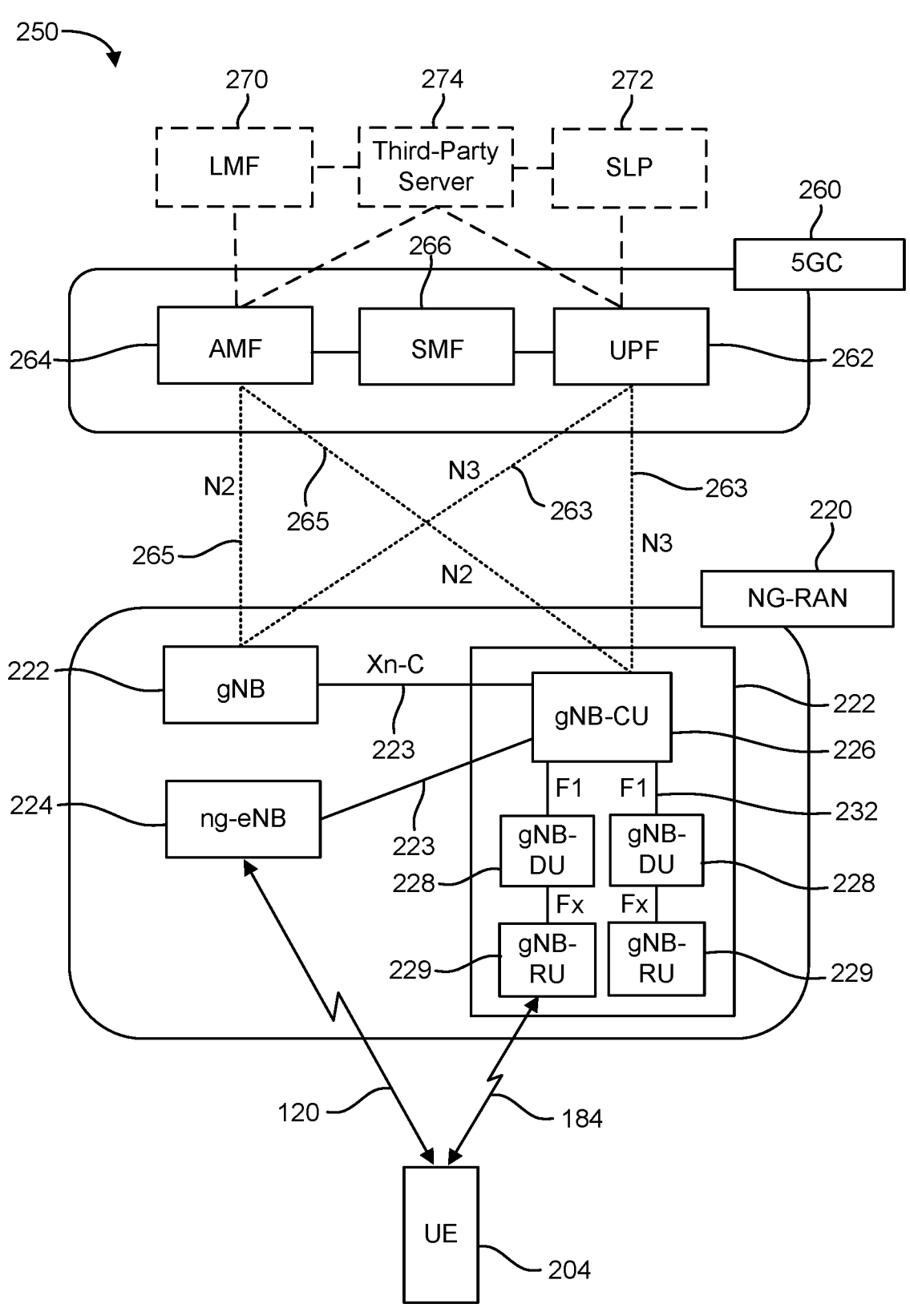

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
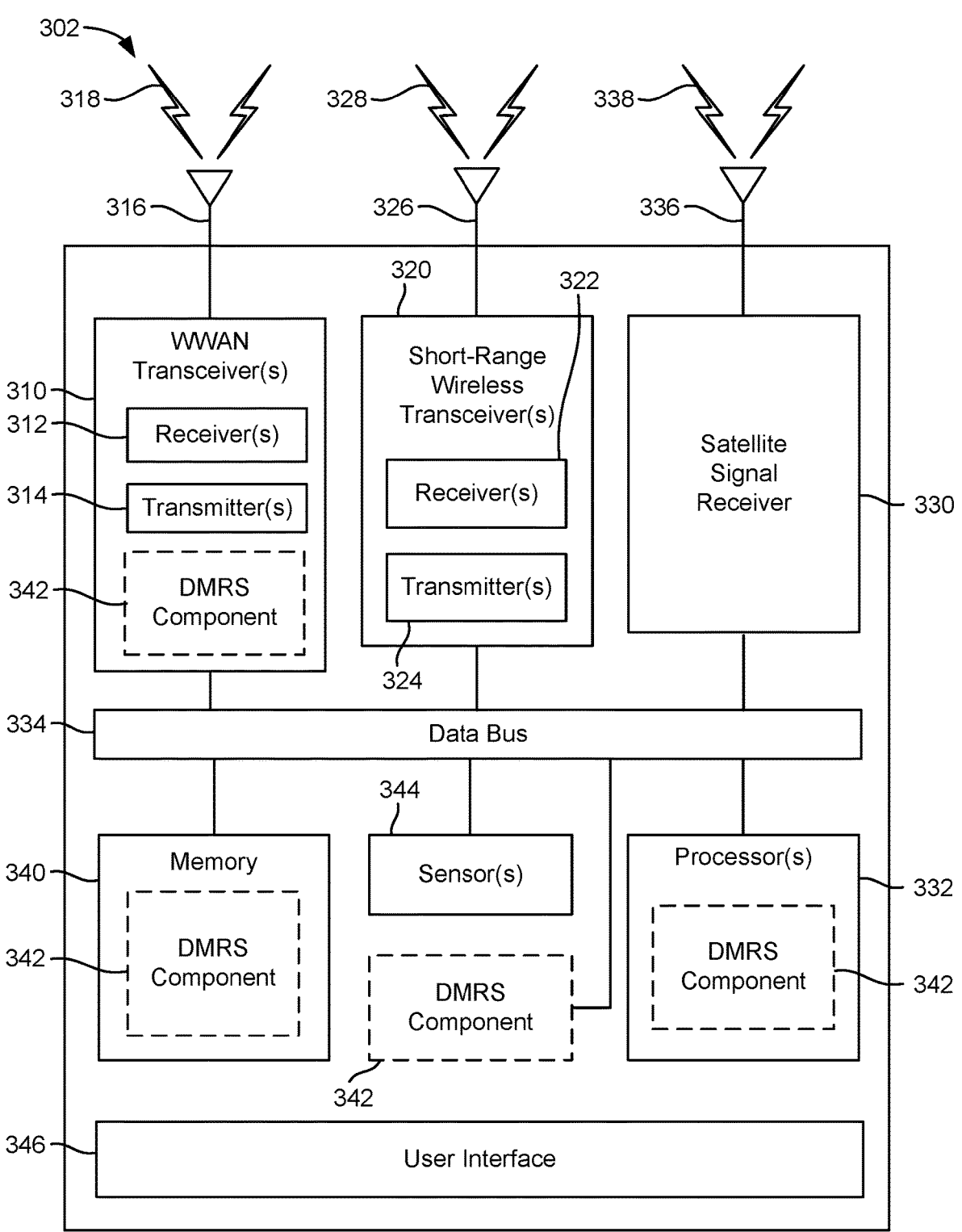
FIGS. 3A, 3B, and 3C are simplified block diagrams of several sample aspects of components that may be employed in a user equipment (UE), a base station, and a network entity, respectively, and configured to support communications as taught herein.
Figure 3B:
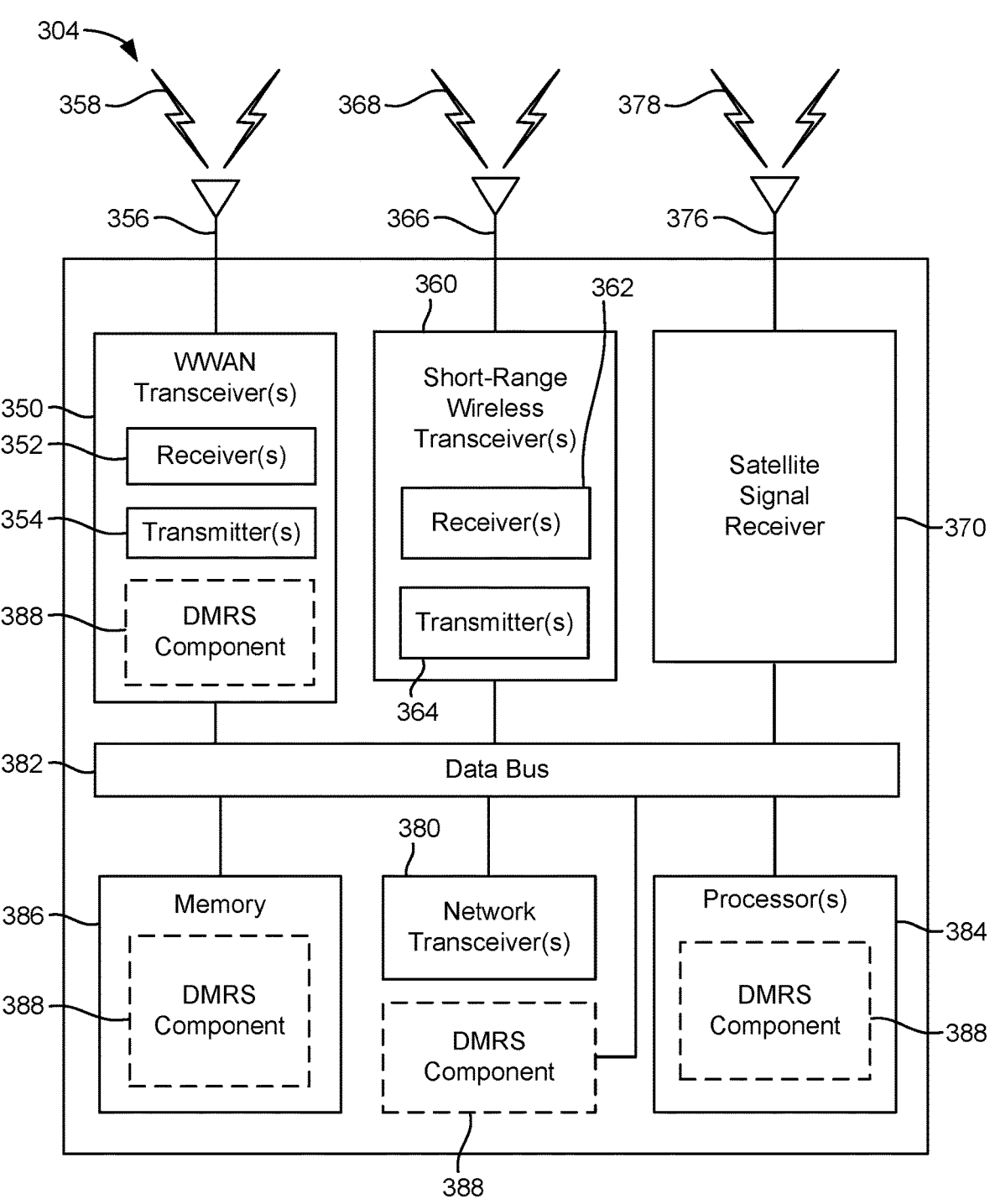
Figure 3C:
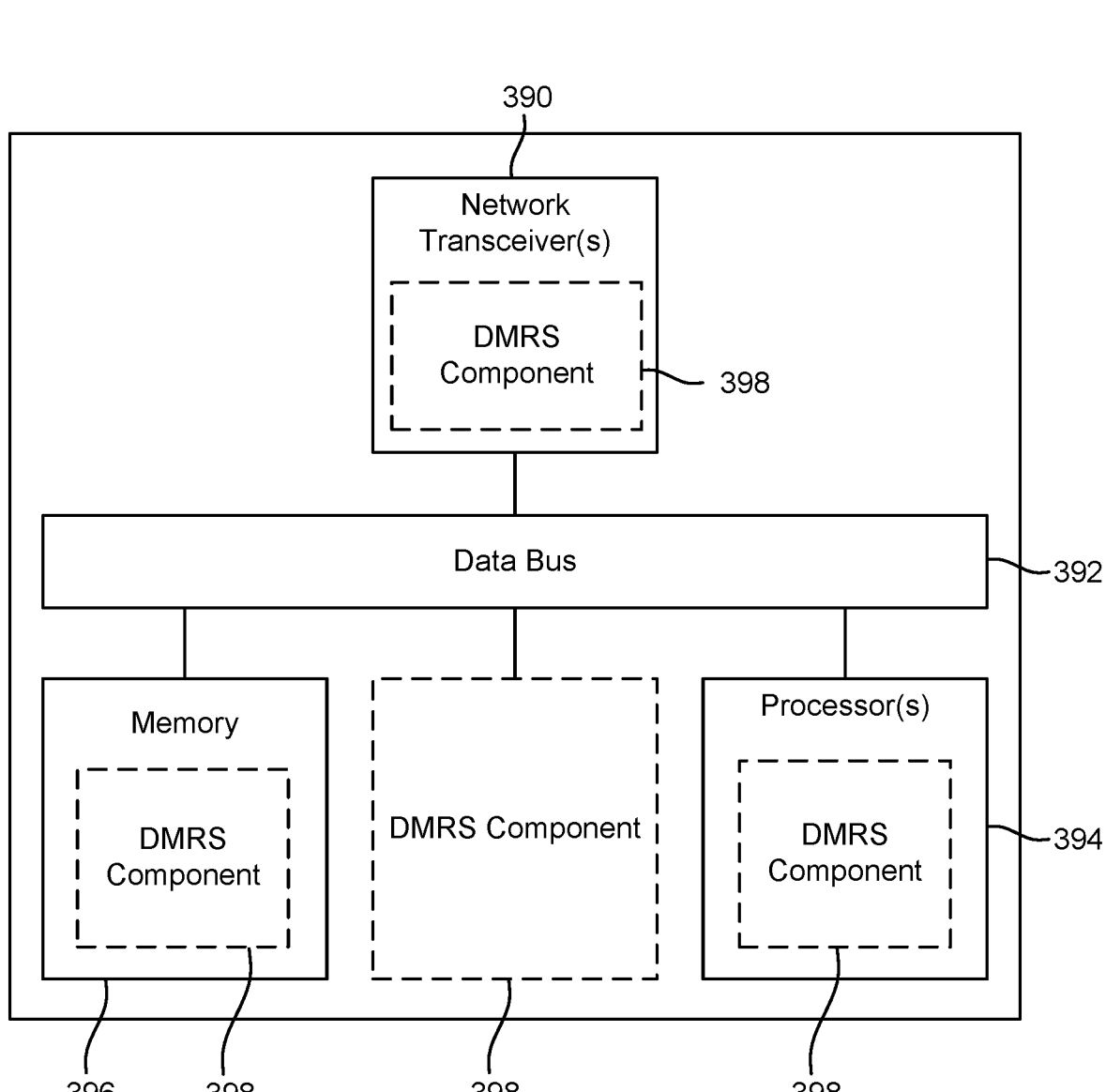

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include DMRS component 342, 388, and 398, respectively. The DMRS component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the DMRS component 342, 388, and 398 may be external to the processors 332, 384, and 394 (e.g., part of a modem processing system, integrated with another processing system, etc.). Alternatively, the DMRS component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the DMRS component 342, which may be, for example, part of the one or more WWAN transceivers 310, the memory 340, the one or more processors 332, or any combination thereof, or may be a standalone component. FIG. 3B illustrates possible locations of the DMRS component 388, which may be, for example, part of the one or more WWAN transceivers 350, the memory 386, the one or more processors 384, or any combination thereof, or may be a standalone component. FIG. 3C illustrates possible locations of the DMRS component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the DMRS component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
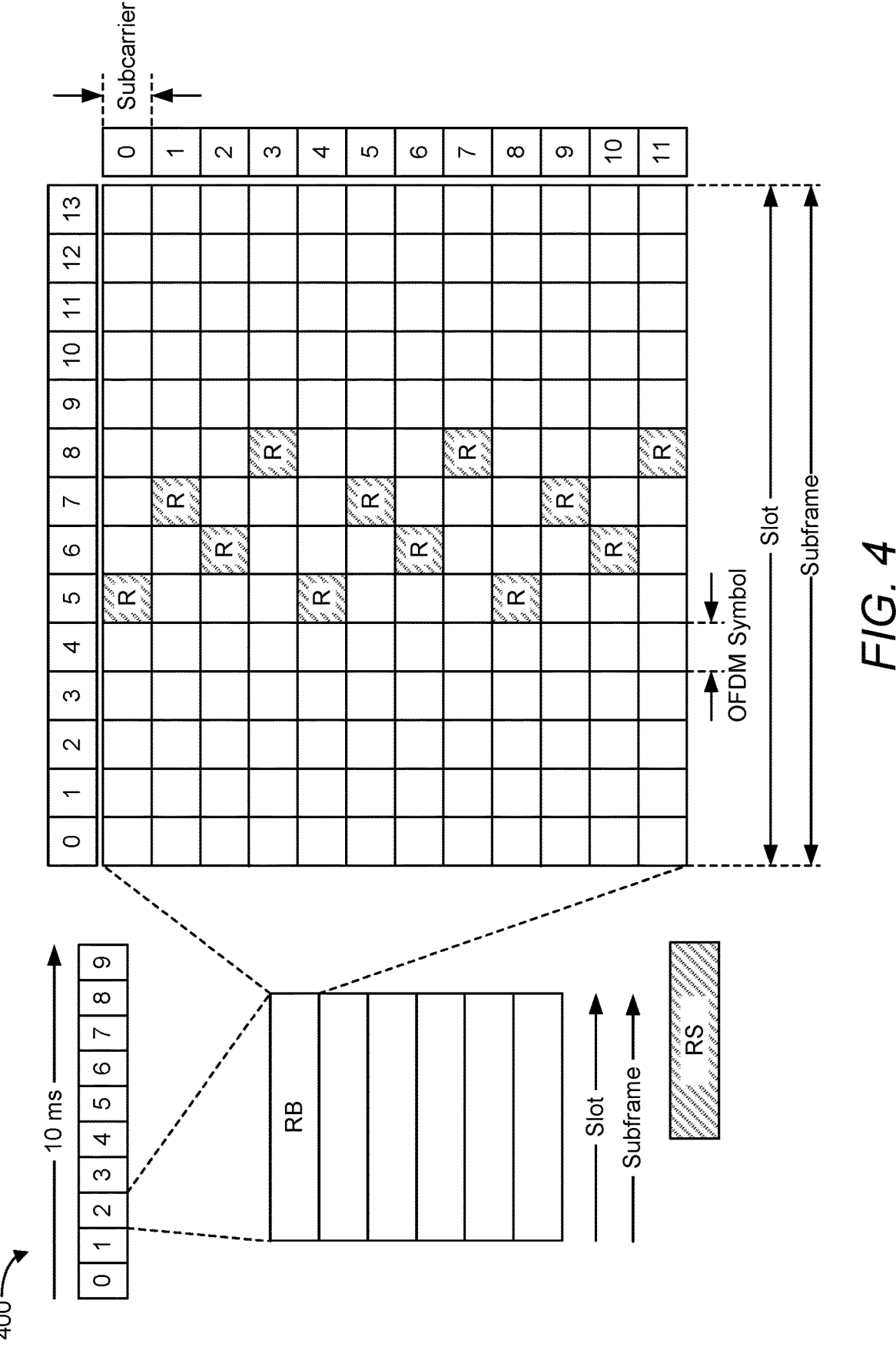
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
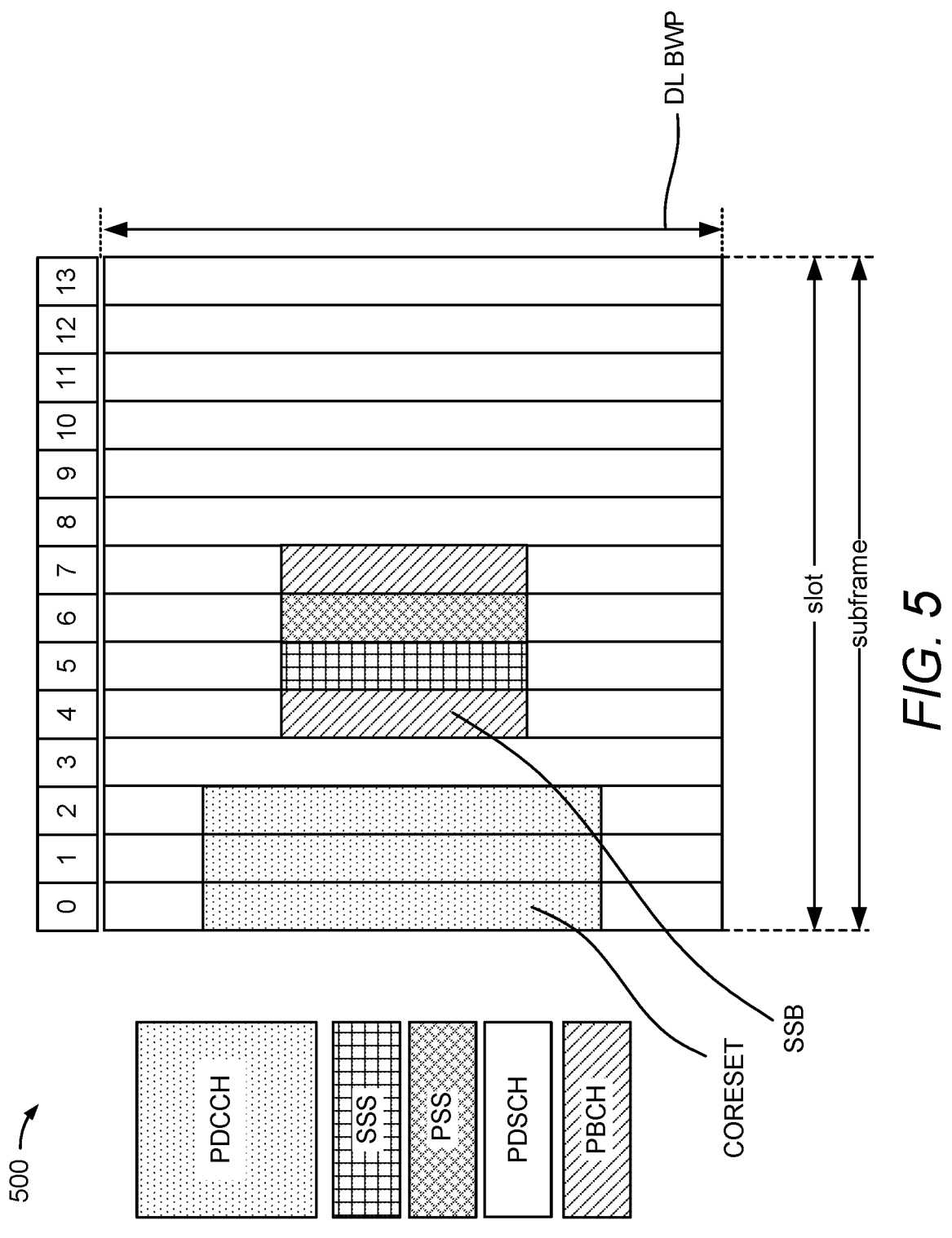
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 6:
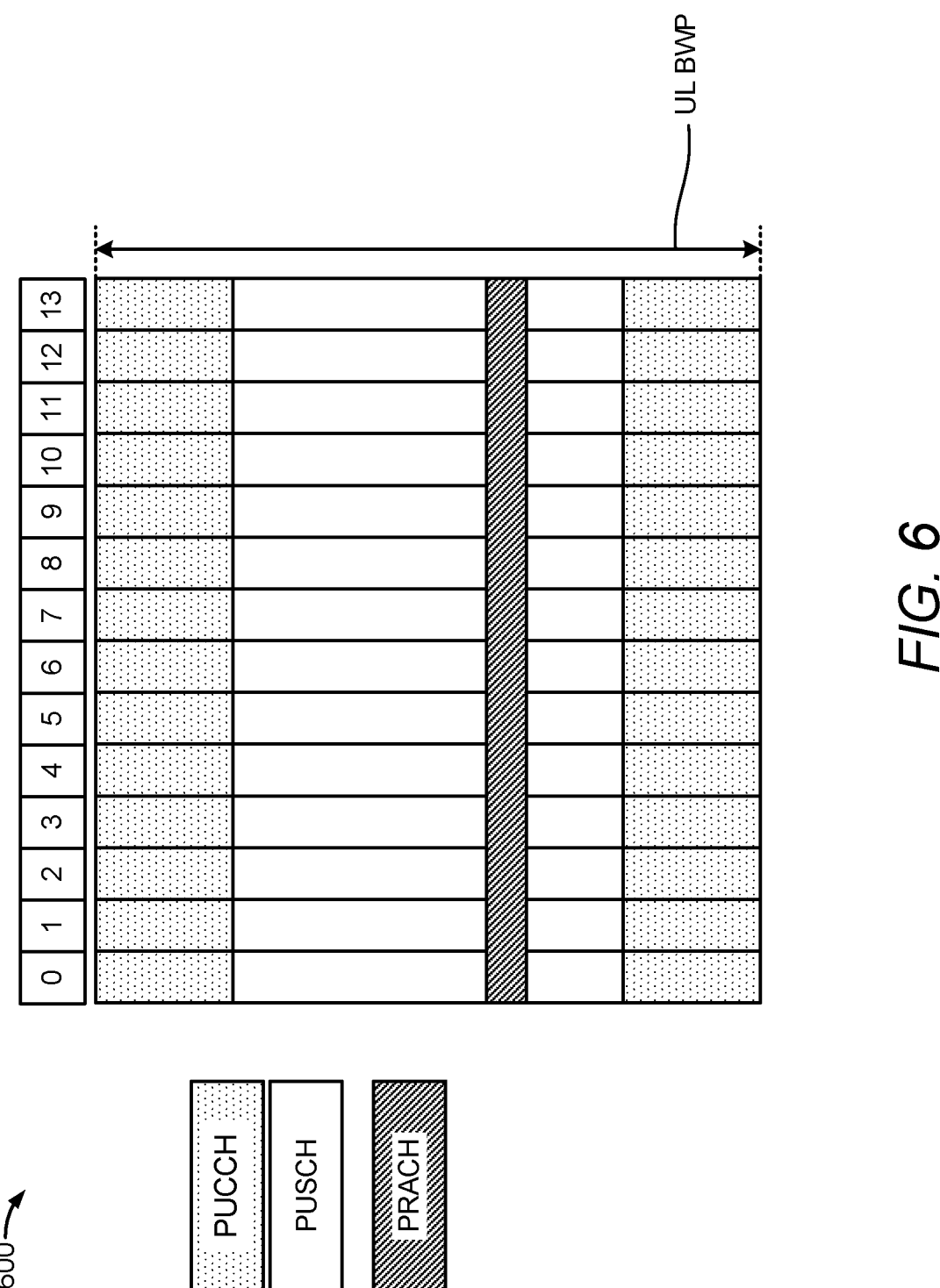
FIG. 6 is a diagram illustrating various uplink channels within an example uplink slot, according to aspects of the disclosure.

FIG. 6 is a diagram 600 illustrating various uplink channels within an example uplink slot. In FIG. 6, time is represented horizontally (on the X axis) with time increasing from left to right, while frequency is represented vertically (on the Y axis) with frequency increasing (or decreasing) from bottom to top. In the example of FIG. 6, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink resources can be (pre) configured to occupy fewer than the 14 symbols of a slot.

Sidelink resources are configured at the radio resource control (RRC) layer. The RRC configuration can be by pre-configuration (e.g., preloaded on the UE) or configuration (e.g., from a serving base station).

Figure 7A:
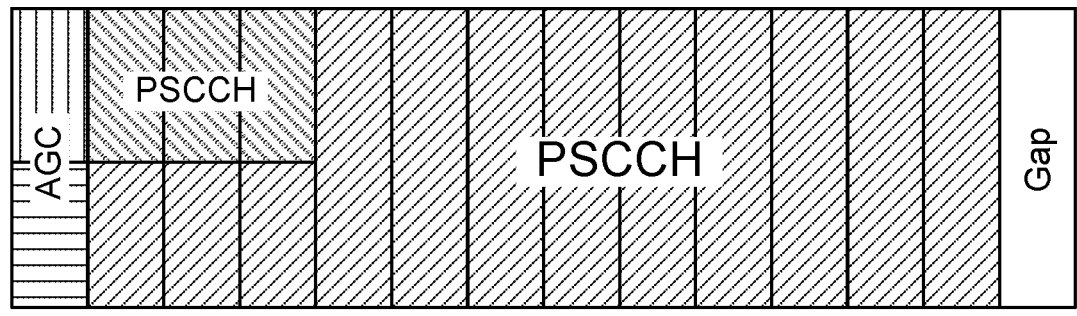
FIGS. 7A and 7B are diagrams of example sidelink slot structures with and without feedback resources, according to aspects of the disclosure.

NR sidelinks support hybrid automatic repeat request (HARQ) retransmission. FIG. 7A is a diagram 700 of an example slot structure without feedback resources, according to aspects of the disclosure. In the example of FIG. 7A, time is represented horizontally and frequency is represented vertically. In the time domain, the length of each block is one orthogonal frequency division multiplexing (OFDM) symbol, and the 14 symbols make up a slot. In the frequency domain, the height of each block is one sub-channel. Currently, the (pre) configured sub-channel size can be selected from the set of {10, 15, 20, 25, 50, 75, 100} physical resource blocks (PRBs).

For a sidelink slot, the first symbol is a repetition of the preceding symbol and is used for automatic gain control (AGC) setting. This is illustrated in FIG. 7A by the vertical and horizontal hashing. As shown in FIG. 7A, for sidelink, the physical sidelink control channel (PSCCH) and the physical sidelink shared channel (PSSCH) are transmitted in the same slot. Similar to the physical downlink control channel (PDCCH), the PSCCH carries control information about sidelink resource allocation and descriptions about sidelink data transmitted to the UE. Likewise, similar to the physical downlink shared channel (PDSCH), the PSSCH carries user date for the UE. In the example of FIG. 7A, the PSCCH occupies half the bandwidth of the sub-channel and only three symbols. Finally, a gap symbol is present after the PSSCH.

Figure 7B:
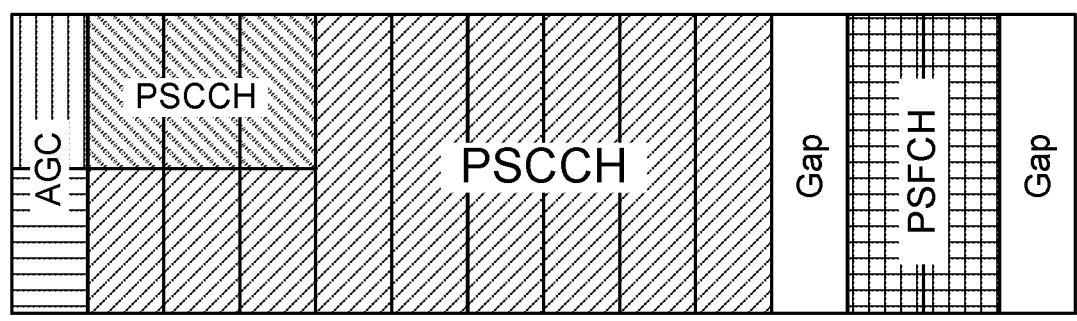

FIG. 7B is a diagram 750 of an example slot structure with feedback resources, according to aspects of the disclosure. In the example of FIG. 7B, time is represented horizontally and frequency is represented vertically. In the time domain, the length of each block is one OFDM symbol, and the 14 symbols make up a slot. In the frequency domain, the height of each block is one sub-channel.

The slot structure illustrated in FIG. 7B is similar to the slot structure illustrated in FIG. 7A, except that the slot structure illustrated in FIG. 7B includes feedback resources. Specifically, two symbols at the end of the slot have been dedicated to the physical sidelink feedback channel (PSFCH). The first PSFCH symbol is a repetition of the second PSFCH symbol for AGC setting. In addition to the gap symbol after the PSSCH, there is a gap symbol after the two PSFCH symbols. Currently, resources for the PSFCH can be configured with a periodicity selected from the set of {0, 1, 2, 4} slots.

Figure 8:
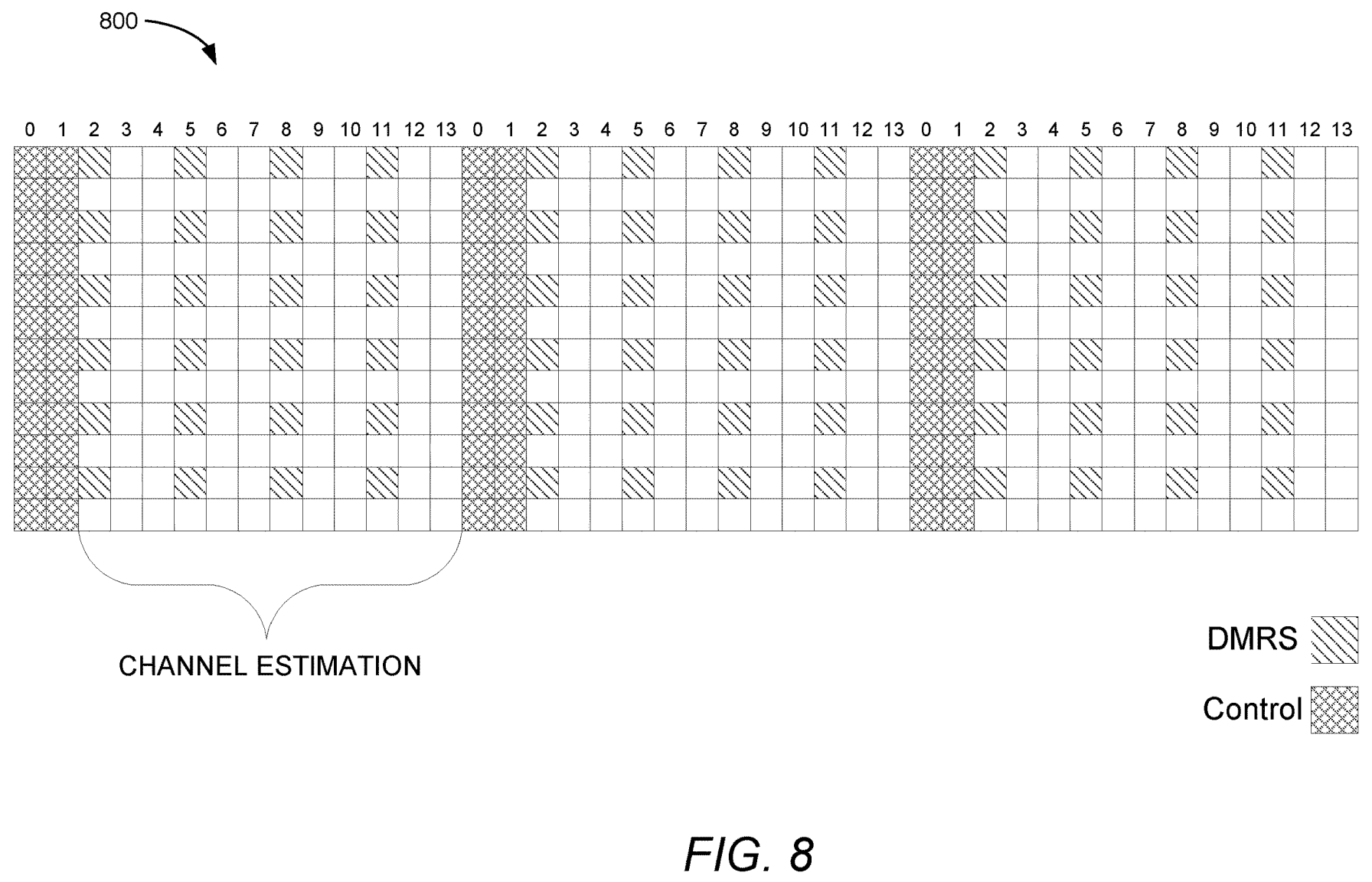

FIG. 8 illustrates a slot configuration 800 in accordance with aspects of the disclosure. In FIG. 8, DMRS in each slot is used for channel estimation in that slot only. The slot configuration 800 depicts legacy operation without DMRS bundling between slots. In FIG. 8, since DMRS in each slot is used for channel estimation in that slot only, the transmitter is not required to maintain phase continuity between the slots (e.g., the transmitter can vary parameters such as transmission power, frequency resource allocation, spatial transmission relation, antenna ports, precoding, etc.

Figure 9:
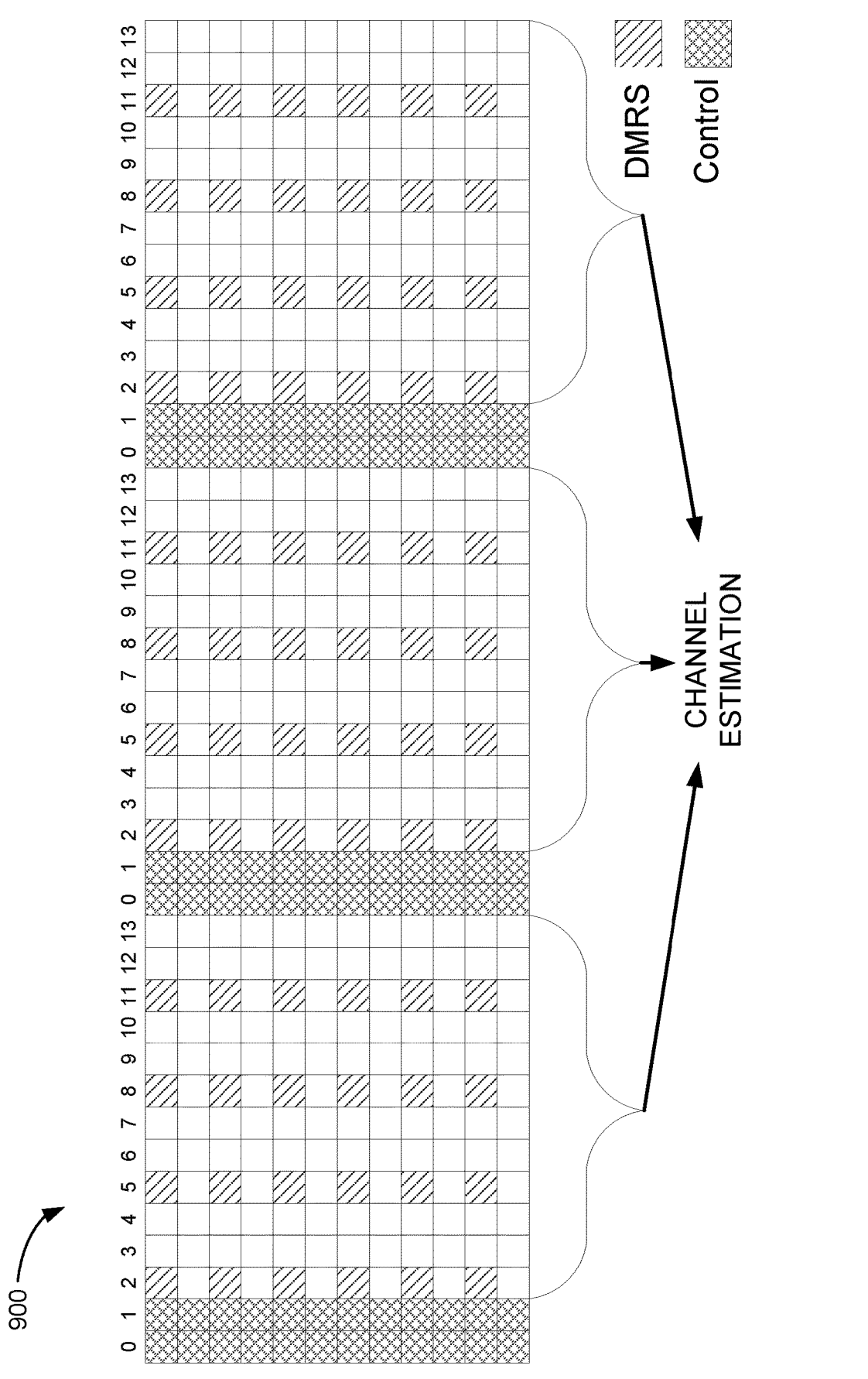
FIG. 9 illustrates a slot configuration in accordance with aspects of the disclosure.

FIG. 9 illustrates a slot configuration 900 in accordance with aspects of the disclosure. In FIG. 9, DMRSs in three different slots are 'bundled' together. In this case, the receiver performs joint channel estimation on the DMRS in multiple time slots for multiple UL transmissions (PUSCH or PUCCH) to improve the accuracy of channel estimation and enhance coverage. For DMRS bundling, the transmitter may be required to maintain phase continuity across the multiple UL transmissions in the respective slots. Various conditions for maintaining phase continuity on the multiple UL transmissions may be utilized, such as maintaining the same frequency resource allocation, the same transmission power, the same spatial transmission relation, the same antenna ports, the same precoding, etc.

Figure 10:
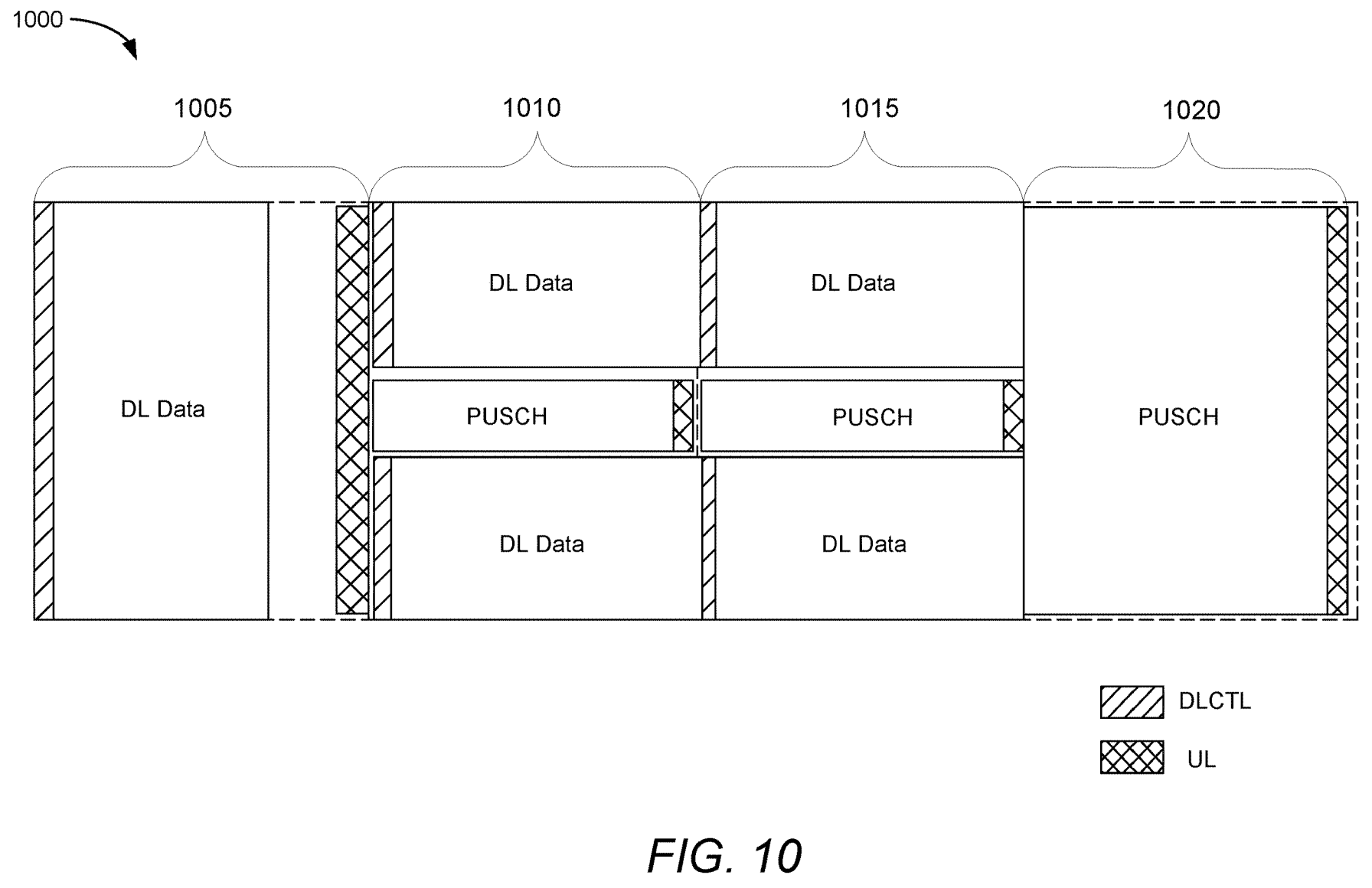

FIG. 10 illustrates an example resource allocation 1000 for a frequency division duplex (FDD) BS and one or more UEs in accordance with an aspect of the disclosure. The allocation of resources in FIG. 10 may be used to facilitate communication with full-duplex UEs, half-duplex UEs, or both. The resource allocation 1000 in includes sub-band half duplex (SBHD) slots 1005 and 1020, and sub-band full duplex (SBFD) slots 1010 and 1015. In particular, SBFD slots 1010 and 1015 are configured with a first disjoint BWP DL segment and a second disjoint BWP DL segment. In some designs, the first and second BWP DL segments may be associated with DL transmissions to different UEs. The first and second disjoint BWP DL segments are separated by a BWP UL segment (e.g., PUSCH for one of the UEs associated with the firs and/or second disjoint BWP DL segments or a different UE) and guard bands (GBs). In some designs, the BWP UL segment may be associated with UL transmissions from one or more of the different UEs. In some systems such as 5G, the first and second disjoint BWP DL segments may correspond to sub-BWP segments.

Figure 11:
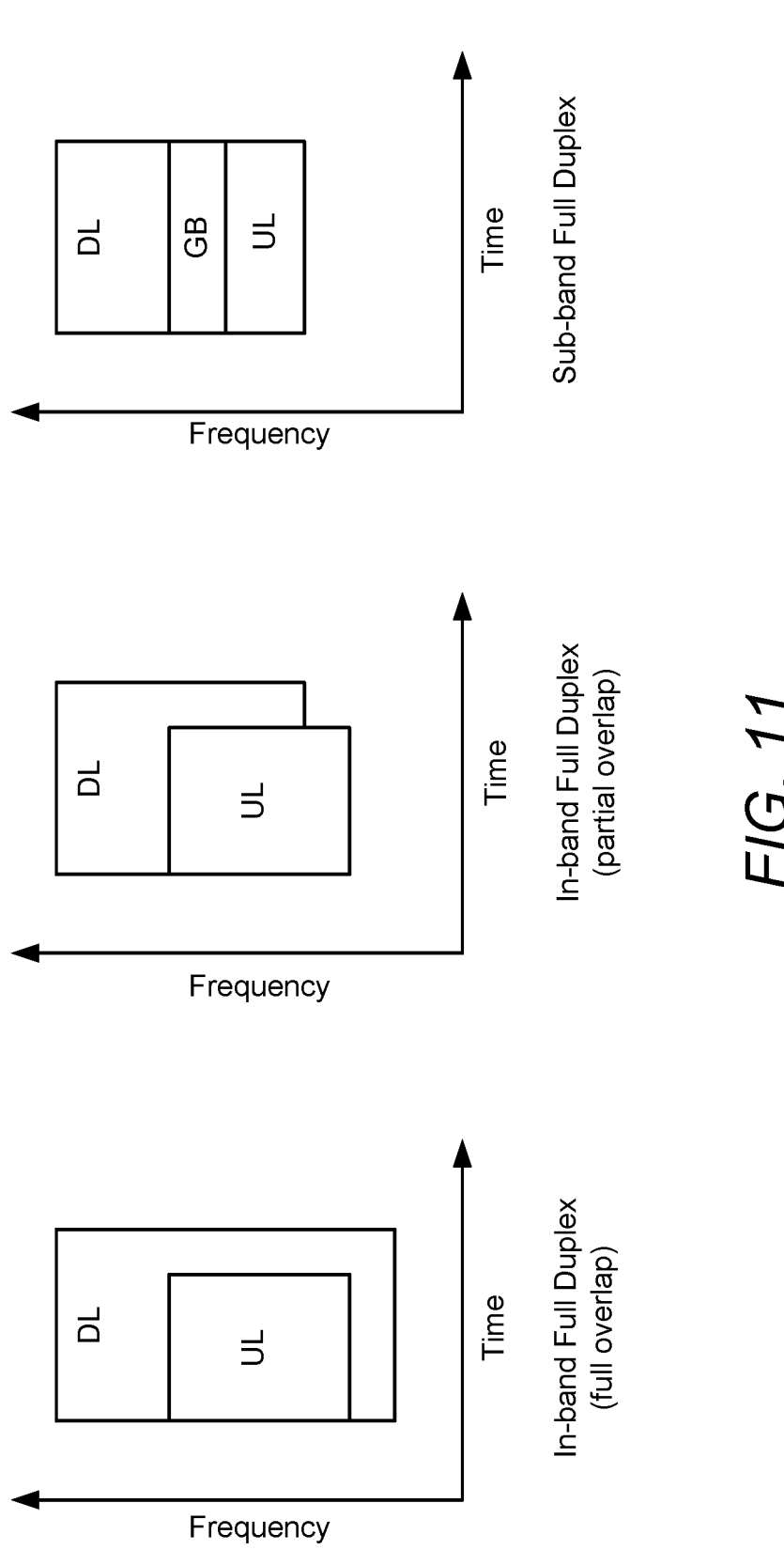
FIG. 11 is a diagram illustrating one or more examples of full-duplex types, in accordance with various aspects of the present disclosure.

FIG. 11 is a diagram illustrating one or more examples 1100 of full-duplex types, in accordance with various aspects of the present disclosure. As described above, full-duplex operation may involve communications having both an uplink (UL) and a downlink (DL) at the same time (e.g., transmit and receive at the same time). The uplink and downlink may share resources (e.g., time resources and/or frequency resources) associated with the communications.

As shown in FIG. 11, a full-duplex communication may be an in-band full duplex (IBFD) mode (e.g., a mode that includes an uplink and a downlink that share the same time resources and/or frequency resources). In some aspects, an IBFD mode may be a full overlap IBFD mode, such that the downlink resources may completely overlap the uplink resources (e.g., all of the uplink resources are shared with the downlink resources). In some aspects, a full overlap IBFD mode may have uplink resources that completely overlap the downlink resources. In some aspects, an IBFD communication may be a partial overlap IBFD mode, such that the downlink resources do not completely overlap the uplink resources (e.g., only some of the uplink resources are shared with the downlink resources).

In some aspects, a full-duplex mode may be a sub-band frequency division duplex (FDD) mode (e.g., a mode that includes an uplink and a downlink that share the same time resources, and use different frequency resources). In some aspects, the resources associated with the downlink and the resources associated with the uplink may be separated in the frequency domain by a guard band (GB) (e.g., a range of frequencies that are not allocated to the uplink or the downlink).

In some aspects, sub-band full-duplex may be utilized for FDD in unpaired spectrum. For example, FDD may be utilized within a component carrier (CC) bandwidth. For example, from a total BWP bandwidth (e.g., 100 MHz), UL BWP may be associated with a first bandwidth (e.g., 20 MHz) and DL BWP may be associated with a second bandwidth (e.g., 80 MHz). In some designs, a GB in frequency may exist between the UL and DL BWPs. Other partitions of BW are not precluded. The respective UL and DL BWP configurations may also be subject to interference alignment b/w gNBs and operators. While FIG. 10 illustrates one example resource allocation 1000 for FDFD in unpaired spectrum, other configurations are possible (e.g., all slots may be SBFD, UL and DL BWPs may be fixed and contiguous across all slots, UL and DL BWPs may be alternate or be swapped between slots, UL and DL BWPs may have variable sizes that vary between slots, etc.).

FIG. 12 illustrates Resource bandwidth (BW) configurations 1200 within an active BWP in accordance with aspects of the disclosure. The active BWP in FIG. 12 may correspond to UL BWP or DL BWP. In some designs, within the active BWP, different Resource BW(s) may be defined and dynamically indicated (e.g., to UE) which Resource BW(s) to use. In some designs, the indication of the Resource BW(s) is dynamic (e.g., DCI-based). In some designs, the Resource BW(s) are RRC-configured. In some designs, a Resource BW may be disjoint or non-contiguous, as shown with respect to Resource BW 3. In some designs, frequency domain resource allocation (FDRA) per Resource BW can be determined with fewer bits as compared to the active BWP. In some designs, UL and DL may have different Resource BW configurations. In some designs, each Resource BW has optimized configurations. In some designs, UL/DL resource BWs can be non-overlapping (i.e., SBFD) or partially overlapping (IBFD). In some designs, zero delay for switching between resource BWs may be assumed (e.g., since the UE is active across the active BWP which includes the various resource BWs).

FIG. 13 illustrates a slot configuration 1300 in accordance with aspects of the disclosure. In FIG. 13, Resource BW 1 is associated with SBHD symbols 1-3 across the full active DL BWP, and Resource BW 2 is associated with SBFD symbols 4-8 on a subset of the active DL BWP.

Figure 14:
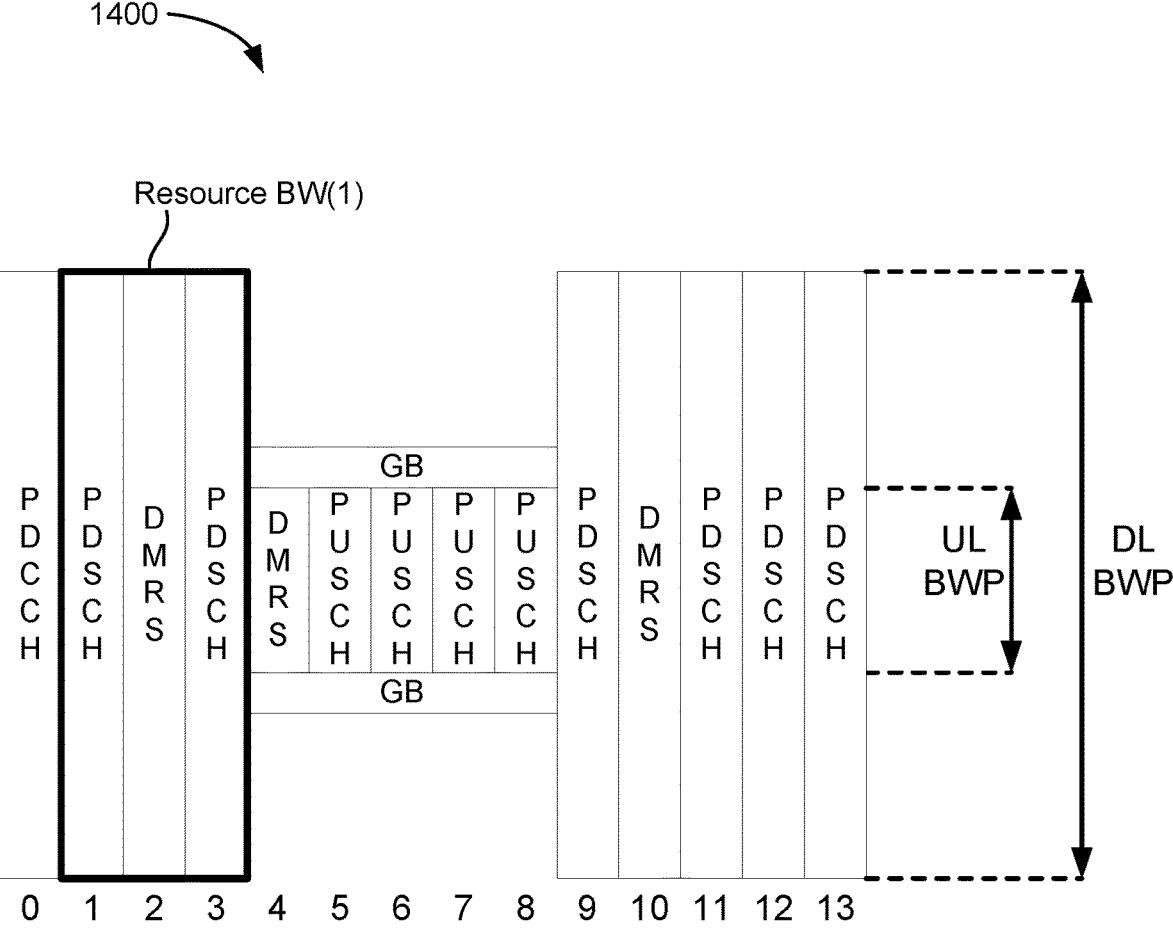
FIG. 14 illustrates a slot configuration in accordance with aspects of the disclosure.

FIG. 14 illustrates a slot configuration 1400 in accordance with aspects of the disclosure. In FIG. 14, Resource BW 1 is associated with SBHD symbols 1-3 across the full active DL BWP.

Figure 15:
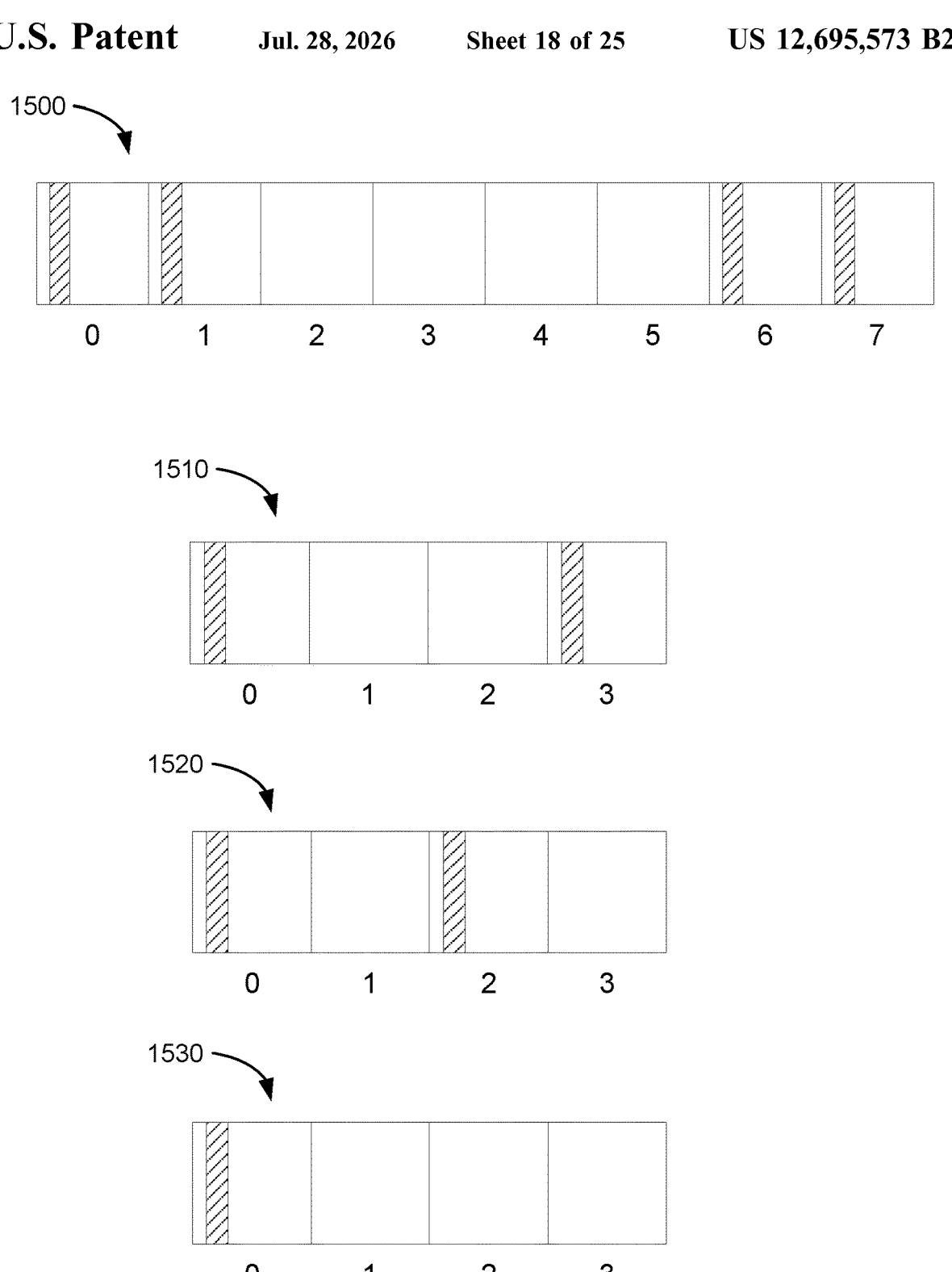
FIG. 15 illustrates DMRS-bundling examples in accordance with aspects of the disclosure.

FIG. 15 illustrates DMRS-bundling examples in accordance with aspects of the disclosure. At 1500, a sequence of DMRS-bundled slots 0-7 is depicted in association with UL or DL transmissions, with DMRS being transmitted in slots 0-1 and 6-7. At 1510, a sequence of DMRS-bundled slots 0-3 is depicted in association with UL or DL transmissions, with DMRS being transmitted in slots 0 and 3. At 1520, a sequence of DMRS-bundled slots 0-3 is depicted in association with UL or DL transmissions, with DMRS being transmitted in slots 0 and 2. At 1530, a sequence of DMRS-bundled slots 0-3 is depicted in association with UL or DL transmissions, with DMRS being transmitted in slot 0. Hence, DMRS-bundling may be implemented for a variety of resource configurations with a variety of DMRS placements.

In some designs, sharing or bundling of the DMRS across PDSCHs (or repetitions of the same PDSCH) may occur under the following constraints, e.g.:

Optional Condition 1: The PxSCHs (e.g., PUSCHs or PSSCHs or PDSCHs) that share/bundle the DMRS may be required to be transmitted on FD slots having the same exactly "Resource BW" of the same active BWP. Alternatively, if there exist two Resource BWs, the boundaries of the DL/UL frequency domain portions must be the same, or.

Optional Condition 2: The PxSCHs (e.g., PUSCHs or PSSCHs or PDSCHs) that share/bundle the DMRS may be required to be transmitted on slots having DL (UL) Frequency-domain boundaries unchanged (whereas the UL (DL) could still change), or.

Optional Condition 3: The PxSCHs (e.g., PUSCHs or PSSCHs or PDSCHs) that share/bundle the DMRS may be required to be transmitted on slots which abide by the Optional Condition 1 or Optional Condition 12 without the existence of some other slot in between which has a different DL or UL or DL/UL boundary.

The main reason for having such constraints/restrictions is because the UE may not be able to keep phase continuity (or coherency) across these changes. Hence, one or more of Optional Conditions 1, 2 and/or 3 may be implemented, if any, based on UE capability.

In some designs, assume there is a UE that can still perform bundling/sharing of DMRS of PDSCHs which span across resource BWs that are different, or have different DL/UL edges. Then, consider the case that the bundled PDSCH, are ordered across time as PDSCH1≥PDSCH2≥PDSCH3. The BW of the PDSCHs should be such that PDSCH1 BW≥PDSCH 2 BW≥PDSCH3 BW. If this is not the case, then, in the later PDSCH (e.g., PDSCH3), there will be regions that use different number of DMRS, which would result in uneven performance across the later PDSCHs, and/or complicated implementation.

In DMRS bundling, a UE will typically set a transmission power level based on the first slot within a DMRS bundle. That is, a window of DMRS bundling could start, then based on first slot power control, the UE has to maintain the same transmission power level to maintain phase continuity. However, this transmission power level may not be suitable for some or all of the other slots being bundled. For example, a transmission power level established for an HD slot is typically higher than a transmission power level established for an FD slot. Hence, if the first slot is an HD slot, the transmission power level for the DMRS-bundled slots may be too high for FD slot(s) (e.g., high self-interference). Alternatively, if the first slot is an FD slot, the transmission power level for the DMRS-bundled slots may be too low for HD slot(s).

Aspects of the disclosure relate to selective exclusion of slot(s) from bundling in a DMRS-sharing power control configuration based at least in part upon duplex type (e.g., FD or HD). Such aspects may provide various technical advantages, such as facilitating a more suitable transmission power level for the excluded slot(s), which may improve communication (e.g., reducing self-interference, ensuring that sufficient transmission power is used, etc.). In some designs, such aspects may be implemented in a multiple DCI scenario (e.g., a first DCI indicates the set of slots for DMRS bundling, and a second DCI indicates the duplex configuration for the individual slots).

FIG. 16 illustrates an exemplary process 1600 of wireless communication, according to aspects of the disclosure. In an aspect, the process 1600 may be performed by UE 302.

Referring to FIG. 16, at 1610, UE 302 (e.g., processor(s) 332, DMRS component 342, etc.) bundles a set of slots for transmissions in accordance with a demodulation reference signal (DMRS)-sharing power control configuration that maintains phase continuity by sharing DMRS to fix transmission power for the transmissions across the set of slots. For example, the DMRS-sharing power control configuration may bundle certain slots together so as to facilitate (at the receiver side) joint channel estimation on the DMRS in multiple time slots for multiple transmissions (e.g., PUSCH or PUCCH or PDSCH or PDCCH or PSCCH or PSDCH or PSFCH) to improve the accuracy of channel estimation and enhance coverage. At the transmitter side, the DMRS-sharing power control configuration may require that certain parameters are fixed for transmissions across all bundled slots to maintain the above-noted phase continuity. As noted with respect to 1610, the fixed parameters may at least include transmission power, and in some designs may also include other parameters such as frequency resource allocation, spatial transmission relation, antenna port(s), precoding, etc. In some designs, the bundling at 1610 may be performed before the resource configurations for the set of slots is known (e.g., UE 302 does not know which slots are FD and which are HD when the slots are initially bundled). In some designs, the bundling of the set of slots may be specific to one or more Resource BW(s) associated with UE 302, as noted above.

Referring to FIG. 16, at 1620, UE 302 (e.g., processor(s) 332, DMRS component 342, etc.) determines a first transmission power level for a first transmission of first data (e.g., PUSCH or PUCCH or PDSCH or PDCCH or PSCCH or PSDCH or PSFCH) associated with a first duplex type on a first slot of the set of slots in accordance with the DMRS-sharing power control configuration. For example, the first slot may correspond to an initial slot (or earliest slot) of the set of slots. As noted above, the transmission power level of the earliest slot may be fixed (along with other parameters) across the set of slots for which DMRS bundling is performed so as to maintain transmitter phase continuity.

Referring to FIG. 16, at 1630, UE 302 (e.g., processor(s) 332, DMRS component 342, etc.) determines to exclude a second transmission of second data (e.g., PUSCH or PUCCH or PDSCH or PDCCH or PSCCH or PSDCH or PSFCH) associated with a second duplex type on a second slot of the set of slots from the DMRS-sharing power control configuration based at least in part upon the first transmission power level. For example, as noted above, a transmission power level for an FD slot may not be suitable for an HD slot, and a transmission power level for an HD slot may not be suitable for an FD slot. Hence, the duplex type of the initial slot may impact transmission power level suitability of other slot(s) among the bundled slot that are not of the same duplex type.

Referring to FIG. 16, at 1640, UE 302 (e.g., transmitter 314 or 324, etc.) optionally transmits an indication that full-duplex transmissions during the set of slots are excluded from the DMRS-sharing power control configuration. In an example, the optional transmission at 1640 may be performed in a scenario where the determination at 1630 to exclude the second transmission from the DMRS-sharing power control configuration is in response to the first transmission power level being greater than the second transmission power level (e.g., by at least a threshold). For example, if the first slot of the set of slots that determined the first transmission power level for the DMRS-bundled slots is HD, the first transmission power level may be too high for some slots such as FD slots due to self-interference, etc. Hence, in some designs, if the first slot is HD, then UE 302 may transmit an indication that notifies a wireless node (e.g., gNB or another UE in case of sidelink) that FD slots are excluded from the DMRS-bundled slots. In some designs, the transmission of the indication is optional because the wireless node may instead determine the DMRS bundling exclusion implicitly (e.g., based on pathloss measurements, etc.), as will be described in more detail below in more detail.

Referring to FIG. 16, at 1650, UE 302 (e.g., transmitter 314 or 324, etc.) transmits the first data associated with the first duplex type on the first slot at the first transmission power level in accordance with the DMRS-sharing power control configuration. In some designs, the first transmission power level (e.g., as well as other parameters such as frequency resource allocation, spatial transmission relation, antenna ports, precoding, etc.) may also be applied to other slot(s) that remain bundled in accordance with the DMRS-sharing power control configuration (i.e., slot(s) that are not excluded at 1630).

Referring to FIG. 16, at 1660, UE 302 (e.g., transmitter 314 or 324, etc.) transmits the second data associated with the second duplex type on the second slot at a second transmission power level that is different than the first transmission power level. In some designs, if the first duplex type is HD and the second duplex type is FD, the first transmission power level may be higher than the second transmission power level. In other designs, if the first duplex type is FD and the second duplex type is HD, the first transmission power level may be lower than the second transmission power level.

FIG. 17 illustrates an exemplary process 1700 of wireless communication, according to aspects of the disclosure. In an aspect, the process 1700 may be performed by a wireless node, such as a gNB or BS 304 (e.g., in case of Uu or DL/UL communication with the UE performing the process 1600 of FIG. 16), or a UE such as UE 302 (e.g., in case of sidelink communication with the UE performing the process 1600 of FIG. 16).

Referring to FIG. 17, at 1710, the wireless node (e.g., receiver 312 or 322 or 352 or 362, etc.) optionally receives an indication that full-duplex transmissions during a set of slots are excluded from a DMRS-sharing power control configuration. In an example, the optional reception at 1710 may be performed in a scenario where a determination is made to exclude a transmission from a DMRS-sharing power control configuration in response to a first transmission power level being greater than a second transmission power level (e.g., by at least a threshold). For example, if a first slot of the set of slots that determined the first transmission power level for DMRS-bundled slots is HD, the first transmission power level may be too high for some slots such as FD slots due to self-interference, etc. Hence, in some designs, if the first slot is HD, then UE 302 may transmit an indication that notifies the wireless node that FD slots are excluded from the DMRS-bundled slots. In some designs, the reception of the indication is optional because the wireless node may instead determine the DMRS bundling exclusion implicitly (e.g., based on pathloss measurements, etc.), as will be described in more detail below in more detail.

Referring to FIG. 17, at 1720, the wireless node (e.g., receiver 312 or 322 or 352 or 362, etc.) receives a first transmission of first data (e.g., PUSCH or PUCCH or PDSCH or PDCCH or PSCCH or PSDCH or PSFCH) associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots. In some designs, the bundling of the set of slots may be specific to one or more Resource BW(s) associated with UE 302, as noted above. For example, the first slot may correspond to an initial slot (or earliest slot) of the set of slots. As noted above, the transmission power level of the earliest slot may be fixed (along with other parameters) across the set of slots for which DMRS bundling is performed so as to maintain transmitter phase continuity. In some designs, the first transmission power level (e.g., as well as other parameters such as frequency resource allocation, spatial transmission relation, antenna ports, precoding, etc.) may also be applied to other slot(s) that remain bundled in accordance with the DMRS-sharing power control configuration (i.e., slot(s) that are not excluded).

Referring to FIG. 17, at 1730, the wireless node (e.g., receiver 312 or 322 or 352 or 362, etc.) receives a second transmission of second data (e.g., PUSCH or PUCCH or PDSCH or PDCCH or PSCCH or PSDCH or PSFCH) associated with a second duplex type on a second slot of a set of slots, wherein the second data is transmitted by the UE at a second transmission power level. For example, as noted above, a transmission power level for an FD slot may not be suitable for an HD slot, and a transmission power level for an HD slot may not be suitable for an FD slot. Hence, the duplex type of the initial slot may impact transmission power level suitability of other slot(s) among the bundled slot that are not of the same duplex type. In some designs, if the first duplex type is HD and the second duplex type is FD, the first transmission power level may be higher than the second transmission power level. In other designs, if the first duplex type is FD and the second duplex type is HD, the first transmission power level may be lower than the second transmission power level.

Referring to FIG. 17, at 1740, the wireless node (e.g., processor(s) 332 or 384, DMRS component 342 or 388, etc.) determines that the second data is excluded from the DMRS-sharing power control configuration. In some designs, the determination at 1740 is based on an explicit indication of the exclusion, such as via the optional indication from 1710 as described above. In other designs, the DMRS bundling exclusion may be determined at the wireless node implicitly (e.g., based on pathloss measurements, etc.), as will be described in more detail below in more detail.

Referring to FIGS. 16-17, in some designs, the first duplex type is half-duplex and the second duplex type is full-duplex. In this case, the determination to exclude the second transmission from the DMRS-sharing power control configuration may be in response to the first transmission power level being greater than the second transmission power level (e.g., by at least a threshold, e.g., HD power too high for FD). For example, HD power is typically higher (due to higher allocations or higher number of RBs), and if this HD power were used for FD the self-interference would increase (e.g., based on modulation and coding scheme (MCS)), which may cause the FD operation to fail. If using HD-based power allocation of a bundle makes FD fails, then it is important to cease the bundling across the FD slots, i.e., UE does not use with HD power on FD slots. In some designs, an additional problem is that per RB power spectral density (PSD) will increase significantly if the two allocations have significantly different allocations, so this also could be one way to stop using the same power, and hence, cancel including the current FD in the bundling process.

Referring to FIGS. 16-17, in some designs, the first duplex type is full-duplex and the second duplex type is half-duplex. In this case, the determination to exclude the second transmission from the DMRS-sharing power control configuration may be in response to the first transmission power level being less than the second transmission power level (e.g., by at least a threshold, e.g., FD power too lower for HD). For example, if the DMRS bundle starts with FD, then at HD slots, the max power is lower. If the target receive power (Po) after using the FD power is less than what is needed at gNB/Rx side, UE may stop bundling since this will reduce reliability of the HD transmission decoding at the gNB. In some designs, this should be based on RB allocation of both transmissions (e.g., gNB can define some power differential condition (based on Po if the slot is bundled or not), or RB allocation differential between FD and HD). In some designs, one or more rules may be pre-defined, and UEs have to follow them. In other designs, UEs an explicit indication of DMRS bundling is added to transmissions (e.g., one bit UCI/DCI)

Referring to FIGS. 16-17, in some designs, the determination to exclude the second transmission from the DMRS-sharing power control configuration is based on control information signaling from a wireless node. In some designs, the determination to exclude the second transmission from the DMRS-sharing power control configuration is based on a gap between the first slot and the second slot being less than a threshold. For example, since FD resources may change semi-statically, and there is also UL slots only, a UE can indicate to gNB that the UE will not perform any DMRS bundling for FD transmissions within a window. In this case, in an example, gNB can indicate to UE to disable or enable FD or HD specific UL bundling. In other designs, semi-static UL slots may cancel the FD DMRS bundling if the gap is less than a threshold, similarly for FD slots bundling with UL slots in middle.

Referring to FIGS. 16-17, in some designs as noted above, the wireless node may determine that the second transmission is excluded from the DMRS-sharing power control configuration in various ways. For example, the second transmission is excluded from the DMRS-sharing power control configuration is based on a differential between a first pathloss associated with the first transmission and a second pathloss associated with the second transmission, or the determination that the second transmission is excluded from the DMRS-sharing power control configuration is based on an indication from the UE, or the determination that the second transmission is excluded from the DMRS-sharing power control configuration originates at the wireless node and is signaled to the UE.

Referring to FIG. 18, at 1810, UE 302 (e.g., receiver 312 or 322, etc.) receives a duplex configuration associated with a set of slots, wherein the duplex configuration comprises a first slot associated with a first duplex type and a second slot associated with a second duplex type. In some designs, the duplex configuration may be received at 1810 via DCI. In some designs, the DCI may be a single DCI that schedules multiple HD and FD allocations in associated with a configured grant (CG) or semi-persistent scheduling (SPS).

Referring to FIG. 18, at 1820, UE 302 (e.g., processor(s) 332, DMRS component 342, etc.) determines a fixed transmission power level for a demodulation reference signal (DMRS)-sharing power control configuration that is based at least in part upon the duplex configuration. For example, the DMRS-sharing power control configuration may bundle certain slots together so as to facilitate (at the receiver side) joint channel estimation on the DMRS in multiple time slots for multiple transmissions (e.g., PUSCH or PUCCH or PDSCH or PDCCH or PSCCH or PSDCH or PSFCH) to improve the accuracy of channel estimation and enhance coverage. At the transmitter side, the DMRS-sharing power control configuration may require that certain parameters are fixed for transmissions across all bundled slots to maintain the above-noted phase continuity. As noted with respect to 1610, the fixed parameters may at least include transmission power, and in some designs may also include other parameters such as frequency resource allocation, spatial transmission relation, antenna port(s), precoding, etc. As noted above, in some legacy systems, a fixed transmission power level is set for DMRS-bundled slots based only on the initial slot, without regard to the duplex configuration of the set for DMRS-bundled slots. For example, the fixed transmission power level may be selected so as to be suitable for both HD and FD slots among the set of slots, as will be described below in more detail.

Referring to FIG. 18, at 1830, UE 302 (e.g., processor(s) 332, DMRS component 342, etc.) bundles the set of slots for transmissions in accordance with the DMRS-sharing power control configuration that maintains phase continuity by sharing DMRS to fix transmission power at the fixed transmission power level for the transmissions across the set of slots. In some designs, the bundling at 1830 may be performed after the resource configurations (e.g., duplex configuration) for the set of slots is known (e.g., UE 302 knows which slots are FD and which are HD when the slots are initially bundled). In some designs, the bundling of the set of slots may be specific to one or more Resource BW(s) associated with UE 302, as noted above.

Referring to FIG. 18, at 1840, UE 302 (e.g., transmitter 314 or 324, etc.) transmits first data (e.g., PUSCH or PUCCH or PDSCH or PDCCH or PSCCH or PSDCH or PSFCH) associated with the first duplex type on the first slot of the set of slots at the fixed transmission power level in accordance with the DMRS-sharing power control configuration. In some designs, the fixed transmission power level (e.g., as well as other parameters such as frequency resource allocation, spatial transmission relation, antenna ports, precoding, etc.) may also be applied to other slot(s) that remain bundled in accordance with the DMRS-sharing power control configuration.

Referring to FIG. 18, at 1850, UE 302 (e.g., transmitter 314 or 324, etc.) transmits second data (e.g., PUSCH or PUCCH or PDSCH or PDCCH or PSCCH or PSDCH or PSFCH) associated with the second duplex type on the second slot of the set of slots at the fixed transmission power level in accordance with the DMRS-sharing power control configuration. In contrast to FIGS. 16-17, the fixed transmission power level is used for both the first data of the first duplex type as well as the second transmission power level of the second data of the second duplex type. However, unlike some legacy systems, this fixed transmission power level factors the duplex type(s) associated with the DMRS-bundled slots rather than simply being fixed by the initial DMRS-bundled slot.

FIG. 19 illustrates an exemplary process 1900 of wireless communication, according to aspects of the disclosure. In an aspect, the process 1900 may be performed by a wireless node, such as a gNB or BS 304 (e.g., in case of Uu or DL/UL communication with the UE performing the process 1800 of FIG. 18), or a UE such as UE 302 (e.g., in case of sidelink communication with the UE performing the process 1800 of FIG. 18).

Referring to FIG. 19, at 1910, the wireless node (e.g., receiver 312 or 322 or 352 or 362, etc.) transmits a duplex configuration associated with a set of slots, wherein the duplex configuration comprises a first slot associated with a first duplex type and a second slot associated with a second duplex type. In some designs, the duplex configuration may be transmitted at 1910 via DCI. In some designs, the DCI may be a single DCI that schedules multiple HD and FD allocations in associated with a configured grant (CG) or semi-persistent scheduling (SPS).

Referring to FIG. 19, at 1920, the wireless node (e.g., transmitter 314 or 324 or 354 or 364, etc.) receives a first transmission of first data (e.g., PUSCH or PUCCH or PDSCH or PDCCH or PSCCH or PSDCH or PSFCH) associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration. As noted above, in some legacy systems, a fixed transmission power level is set for DMRS-bundled slots based only on the initial slot, without regard to the duplex configuration of the set for DMRS-bundled slots. For example, the fixed transmission power level may be selected so as to be suitable for both HD and FD slots among the set of slots, as will be described below in more detail. In some designs, the fixed transmission power level (e.g., as well as other parameters such as frequency resource allocation, spatial transmission relation, antenna ports, precoding, etc.) may also be applied to other slot(s) that remain bundled in accordance with the DMRS-sharing power control configuration Referring to FIG. 19, at 1930, the wireless node (e.g., transmitter 314 or 324 or 354 or 364, etc.) receives a second transmission of second data (e.g., PUSCH or PUCCH or PDSCH or PDCCH or PSCCH or PSDCH or PSFCH) associated with the second duplex type on the second slot of the set of slots at the fixed transmission power level in accordance with the DMRS-sharing power control configuration. In contrast to FIGS. 16-17, the fixed transmission power level is used for both the first transmission of the first duplex type as well as the second transmission power level of the second duplex type. However, unlike some legacy systems, this fixed transmission power level factors the duplex type(s) associated with the DMRS-bundled slots rather than simply being fixed by the initial DMRS-bundled slot.

Referring to FIGS. 18-19, in some designs, the fixed transmission power level is signaled to the UE via one or more scheduled grants from a wireless node (e.g., a new power configuration based on scheduled grants). In some designs, the first duplex type is half-duplex and the second duplex type is full-duplex. In other designs, the first duplex type is full-duplex and the second duplex type is half-duplex.

Referring to FIGS. 18-19, in some designs, the duplex configuration associated with the set of slots is based upon a downlink control information (DCI) that schedules multiple slots associated with the first duplex type, multiple slots associated with the second duplex type, or a combination thereof. For example, if DCI schedules multiple HD and FD transmissions, and the DMRS bundling window is started with one of the occasions scheduled by the DCI, then the UE will know the type of slots used for FD and HD. Hence, instead of configuring the Tx power based on the first transmission within the DMRS bundle, the UE can factor the duplex configuration into the determination of the fixed transmission power level for the DMRS-bundled slots. For example, the fixed transmission power level may be based on both half-duplex transmissions on the first set of slots and full-duplex transmissions on the first set of slots, or the fixed transmission power level may be based only on the half-duplex transmissions on the first set of slots, or the fixed transmission power level may be based only on the full-duplex transmissions on the first set of slots. In this manner, in some designs, a transmission power level that is suitable for both FD slots and HD slots may be determined and used for the DMRS-bundled slots.

Referring to FIGS. 18-19, in some designs, since FD resources may change semi-statically, and there is also UL slots only, a UE can indicate to gNB that the UE will not perform any DMRS bundling for FD transmissions within a window. In this case, in an example, gNB can indicate to UE to disable or enable FD or HD specific UL bundling. In other designs, semi-static UL slots may cancel the FD DMRS bundling if the gap is less than a threshold, similarly for FD slots bundling with UL slots in middle.

Figure 20:
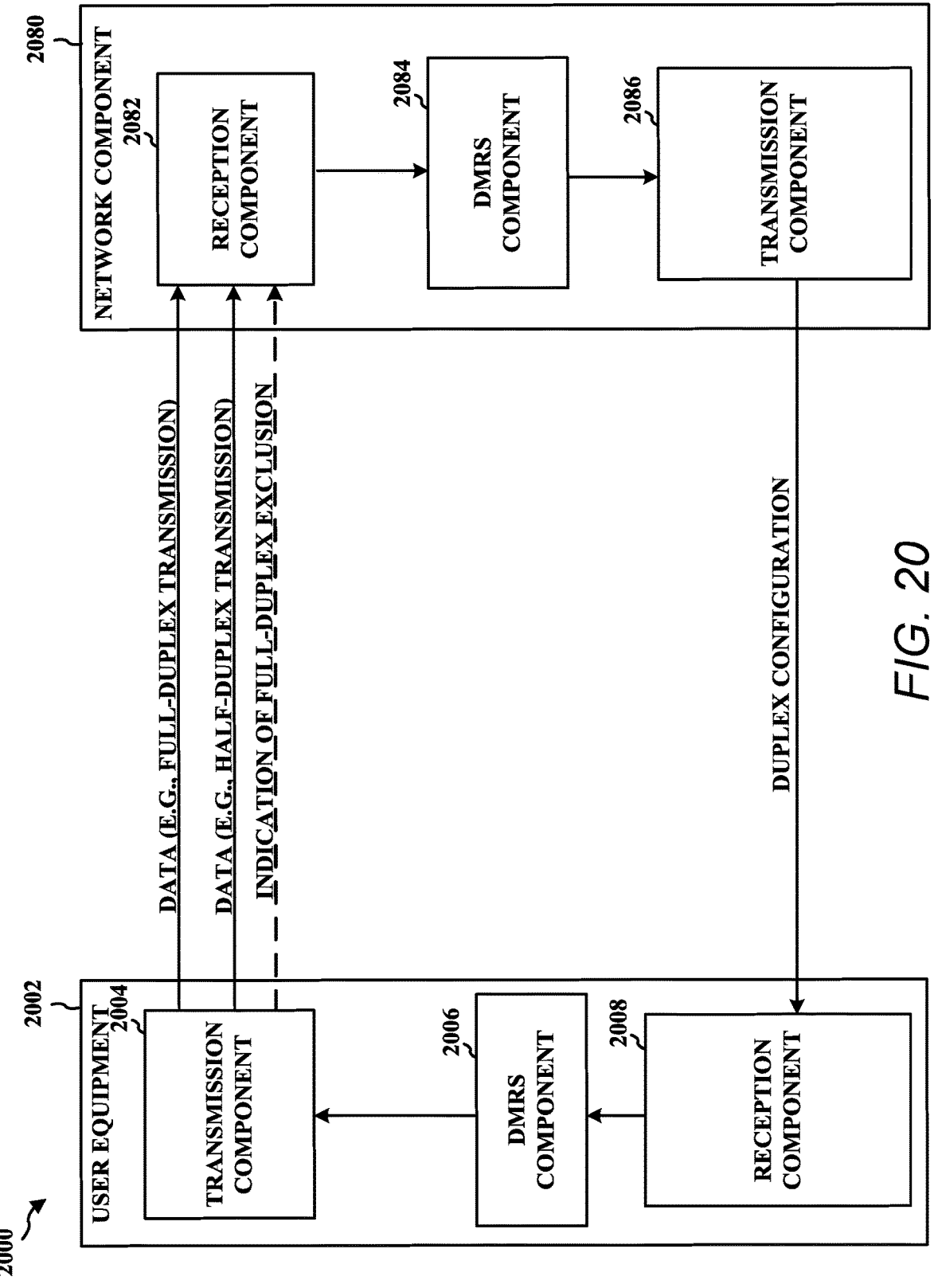
FIG. 20 illustrates an exemplary process of wireless communication, according to aspects of the disclosure.

FIG. 20 is a conceptual data flow diagram 2000 illustrating the data flow between different means/components in exemplary apparatuses 2002 and 2080 in accordance with an aspect of the disclosure. The apparatus 2002 may be a UE (e.g., UE 302, etc.) in communication with an apparatus 2080, which may be a wireless node such as a BS (e.g., BS 304, etc.) or UE (e.g., network entity 306, etc.).

The apparatus 2002 includes a transmission component 2004, which may correspond to transmitter circuitry in UE 302 as depicted in FIG. 3A, including transmitter(s) 314 or 324, antenna(s) 316 or 326, etc. The apparatus 2002 further includes DMRS component 2006, which may correspond to processor circuitry in UE 302 as depicted in FIG. 3A, including processing system 332, etc. The apparatus 2002 further includes a reception component 2008, which may correspond to receiver circuitry in UE 302 as depicted in FIG. 3A, including receiver(s) 312 or 322, antenna(s) 316 or 326, etc.

The apparatus 2080 includes a transmission component 2086, which may correspond to transmitter circuitry in UE 302 as depicted in FIG. 3A or in BS 304 as depicted in FIG. 3B, including transmitter(s) 314 or 324 or 354 or 364, antenna(s) 316 or 326 or 356 or 366, etc. The apparatus 2080 further includes DMRS component 2084, which may correspond to processor circuitry in UE 302 or BS 304, as depicted in FIGS. 3A-3B, including processing system 332 or 384, etc. The apparatus 2080 further includes a reception component 2082, which may correspond to receiver circuitry in UE 302 or BS 304 as depicted in FIGS. 3A-3B, including receiver(s) 312 or 322 or 352 or 362, antenna(s) 316 or 326 or 356 or 366, etc.

Referring to FIG. 20, the DMRS component 2084 directs the transmission component 2086 to transmit a duplex configuration for a set of slots to the reception component 2008. The duplex configuration may be transmitted to the reception component 2008 via DCI (e.g., via a single DCI that configures a set of DMRS-bundled slots, or via a separate DCI). The DMRS component 2006 directs the transmission component 2004 to perform a full-duplex transmission and a half-duplex transmission to the reception component 2082. In some designs, the full-duplex transmission and the half-duplex transmission are part of DMRS-bundled slots with phase continuity (e.g., with fixed transmission power level based on the duplex configuration). In other designs, the DMRS component 2006 excluded one of the full-duplex transmission and the half-duplex transmission from the DMRS-bundled slots. In some designs, the full-duplex transmission may be excluded from bundling with the half-duplex transmission, in which case the transmission component 2004 may optionally transmit an indication of full-duplex transmission to the DMRS component 2084 via the reception component 2082.

One or more components of the apparatus 2002 and apparatus 2080 may perform each of the blocks of the algorithm in the aforementioned flowcharts of FIGS. 16-19. As such, each block in the aforementioned flowcharts of FIGS. 16-19 may be performed by a component and the apparatus 2002 and apparatus 2080 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
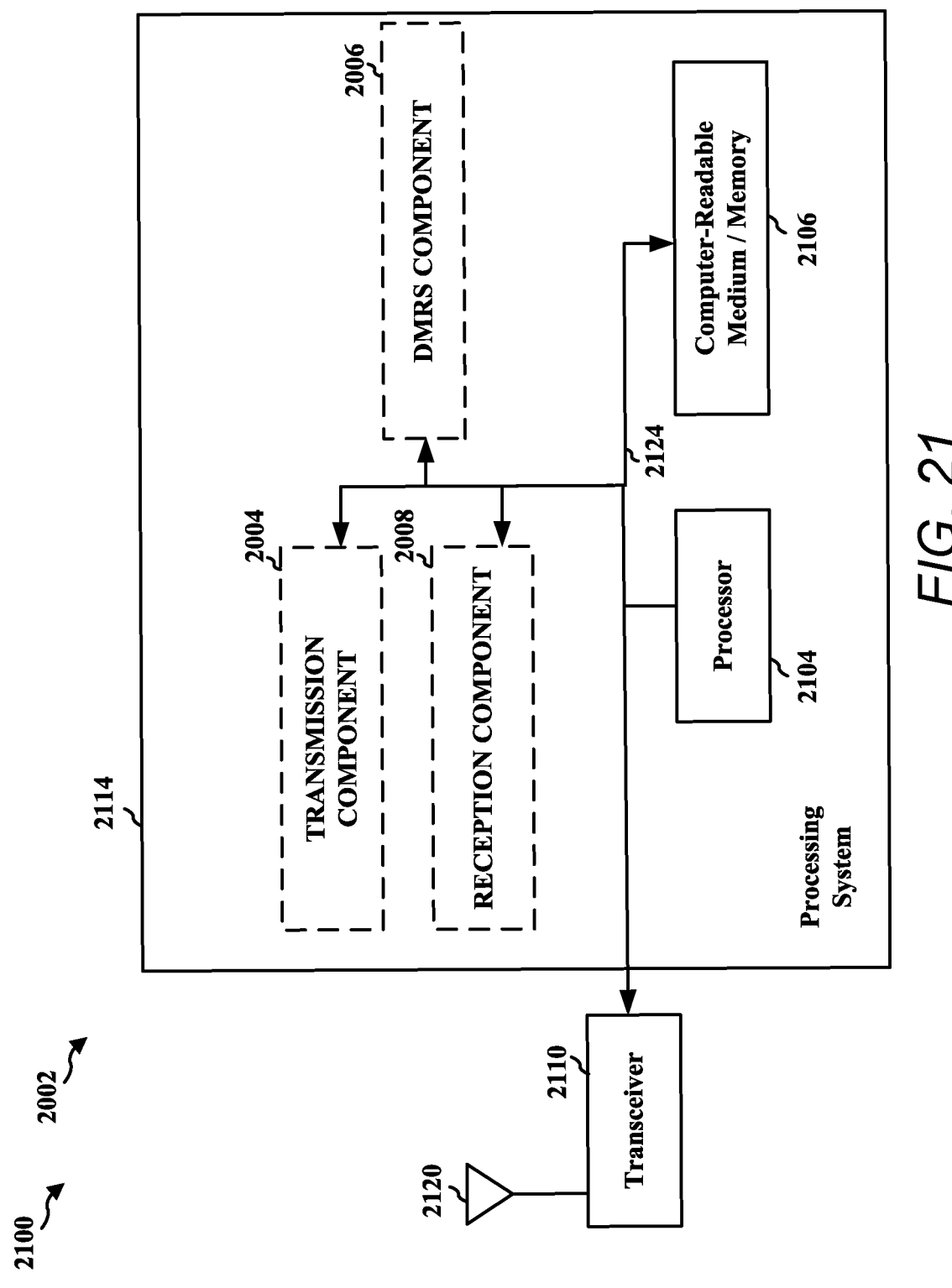
FIG. 21 is a conceptual data flow diagram illustrating the data flow between different means/components in exemplary apparatuses in accordance with an aspect of the disclosure.

FIG. 21 is a diagram 2100 illustrating an example of a hardware implementation for an apparatus 2002 employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2006 and 2008, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2008. In addition, the transceiver 2110 receives information from the processing system 2114, specifically the transmission component 2004, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2006 and 2008. The components may be software components running in the processor 2104, resident/stored in the computer readable medium/memory 2106, one or more hardware components coupled to the processor 2104, or some combination thereof.

In one configuration, the apparatus 2002 includes means for bundling a set of slots for transmissions in accordance with a demodulation reference signal (DMRS)-sharing power control configuration that maintains phase continuity by sharing DMRS to fix transmission power for the transmissions across the set of slots, means for determining a first transmission power level for a first transmission of first data associated with a first duplex type on a first slot of the set of slots in accordance with the DMRS-sharing power control configuration, means for determining to exclude a second transmission of second data associated with a second duplex type on a second slot of the set of slots from the DMRS-sharing power control configuration based at least in part upon the first transmission power level, means for transmitting the first data associated with the first duplex type on the first slot at the first transmission power level in accordance with the DMRS-sharing power control configuration, and means for transmitting the second data associated with the second duplex type on the second slot at a second transmission power level that is different than the first transmission power level.

In one configuration, the apparatus 2002 includes means for receiving a duplex configuration associated with a set of slots, wherein the duplex configuration comprises a first slot associated with a first duplex type and a second slot associated with a second duplex type, means for determining a fixed transmission power level for a demodulation reference signal (DMRS)-sharing power control configuration that is based at least in part upon the duplex configuration, means for bundling the set of slots for transmissions in accordance with the DMRS-sharing power control configuration that maintains phase continuity by sharing DMRS to fix transmission power at the fixed transmission power level for the transmissions across the set of slots, means for transmitting first data associated with the first duplex type on the first slot of the set of slots at the fixed transmission power level in accordance with the DMRS-sharing power control configuration, and means for transmitting second data associated with the second duplex type on the second slot of the set of slots at the fixed transmission power level in accordance with the DMRS-sharing power control configuration.

The aforementioned means may be one or more of the aforementioned components of the apparatus 2002 and/or the processing system 2114 of the apparatus 2002 configured to perform the functions recited by the aforementioned means.

Figure 22:
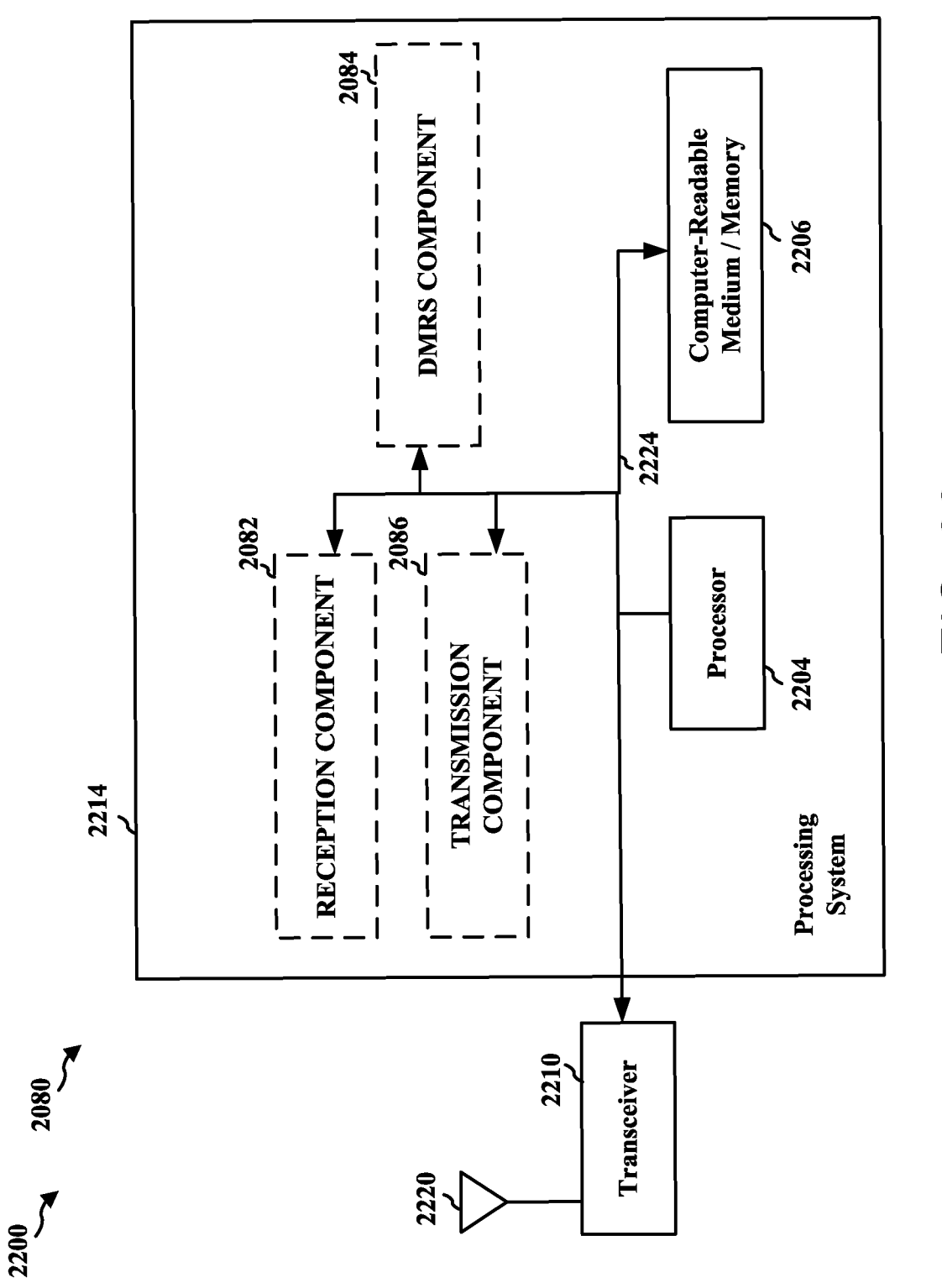
FIG. 22 is a diagram illustrating an example of a hardware implementation for an apparatus employing a processing system.

FIG. 22 is a diagram 2200 illustrating an example of a hardware implementation for an apparatus 2080 employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2082, 2084 and 2086, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2082. In addition, the transceiver 2210 receives information from the processing system 2214, specifically the transmission component 2086, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2082, 2084 and 2086. The components may be software components running in the processor 2204, resident/stored in the computer readable medium/memory 2206, one or more hardware components coupled to the processor 2204, or some combination thereof.

In one configuration, the apparatus 2080 may include means for receiving a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots, means for receiving a second transmission of second data associated with a second duplex type on a second slot of a set of slots, wherein the second data is transmitted by the UE at a second transmission power level, and means for determining that the second data is excluded from the DMRS-sharing power control configuration.

In one configuration, the apparatus 2080 may include means for transmitting a duplex configuration associated with a set of slots, wherein the duplex configuration comprises a first slot associated with a first duplex type and a second slot associated with a second duplex type, means for receiving a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration, and means for receiving a second transmission of second data associated with the second duplex type on the second slot of the set of slots at the fixed transmission power level in accordance with the DMRS-sharing power control configuration.

The aforementioned means may be one or more of the aforementioned components of the apparatus 2080 and/or the processing system 2214 of the apparatus 2080 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: bundling a set of slots for transmissions in accordance with a demodulation reference signal (DMRS)-sharing power control configuration that maintains phase continuity by sharing DMRS to fix transmission power for the transmissions across the set of slots; determining a first transmission power level for a first transmission of first data associated with a first duplex type on a first slot of the set of slots in accordance with the DMRS-sharing power control configuration; determining to exclude a second transmission of second data associated with a second duplex type on a second slot of the set of slots from the DMRS-sharing power control configuration based at least in part upon the first transmission power level; transmitting the first data associated with the first duplex type on the first slot at the first transmission power level in accordance with the DMRS-sharing power control configuration; and transmitting the second data associated with the second duplex type on the second slot at a second transmission power level that is different than the first transmission power level.

Clause 2. The method of clause 1, wherein the first duplex type is half-duplex and the second duplex type is full-duplex.

Clause 3. The method of clause 2, wherein the determination to exclude the second transmission from the DMRS-sharing power control configuration is in response to the first transmission power level being greater than the second transmission power level.

Clause 4. The method of any of clauses 2 to 3, further comprising: transmitting an indication that full-duplex transmissions during the set of slots are excluded from the DMRS-sharing power control configuration.

Clause 5. The method of any of clauses 1 to 4, wherein the first duplex type is full-duplex and the second duplex type is half-duplex.

Clause 6. The method of clause 5, wherein the determination to exclude the second transmission from the DMRS-sharing power control configuration is in response to the first transmission power level being less than the second transmission power level.

Clause 7. The method of any of clauses 1 to 6, wherein the determination to exclude the second transmission from the DMRS-sharing power control configuration is based on control information signaling from a wireless node.

Clause 8. The method of any of clauses 1 to 7, wherein the determination to exclude the second transmission from the DMRS-sharing power control configuration is based on a gap between the first slot and the second slot being less than a threshold.

Clause 9. A method of operating a wireless node, comprising: receiving a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots; receiving a second transmission of second data associated with a second duplex type on a second slot of a set of slots, wherein the second data is transmitted by the UE at a second transmission power level; and determining that the second data is excluded from the DMRS-sharing power control configuration.

Clause 10. The method of clause 9, wherein the determination that the second transmission is excluded from the DMRS-sharing power control configuration is based on a differential between a first pathloss associated with the first transmission and a second pathloss associated with the second transmission, or wherein the determination that the second transmission is excluded from the DMRS-sharing power control configuration is based on an indication from the UE, or wherein the determination that the second transmission is excluded from the DMRS-sharing power control configuration originates at the wireless node and is signaled to the UE.

Clause 11. The method of any of clauses 9 to 10, wherein the first duplex type is half-duplex and the second duplex type is full-duplex.

Clause 12. The method of clause 11, wherein the determination that the second transmission is excluded from the DMRS-sharing power control configuration is in response to the first transmission power level being greater than the second transmission power level.

Clause 13. The method of any of clauses 11 to 12, further comprising: receiving an indication that full-duplex transmissions during the set of slots are excluded from the DMRS-sharing power control configuration.

Clause 14. The method of any of clauses 9 to 13, wherein the first duplex type is full-duplex and the second duplex type is half-duplex.

Clause 15. The method of clause 14, wherein the determination that the second transmission is excluded from the DMRS-sharing power control configuration is in response to the first transmission power level being less than the second transmission power level.

Clause 16. The method of any of clauses 9 to 15, wherein the determination that the second transmission is excluded from the DMRS-sharing power control configuration is based on a gap between the first slot and the second slot being less than a threshold.

Clause 17. The method of any of clauses 9 to 16, wherein the wireless node corresponds to a base station, or wherein the wireless node corresponds to another UE.

Clause 18. A method of operating a user equipment (UE), comprising: receiving a duplex configuration associated with a set of slots, wherein the duplex configuration comprises a first slot associated with a first duplex type and a second slot associated with a second duplex type; determining a fixed transmission power level for a demodulation reference signal (DMRS)-sharing power control configuration that is based at least in part upon the duplex configuration; bundling the set of slots for transmissions in accordance with the DMRS-sharing power control configuration that maintains phase continuity by sharing DMRS to fix transmission power at the fixed transmission power level for the transmissions across the set of slots; transmitting first data associated with the first duplex type on the first slot of the set of slots at the fixed transmission power level in accordance with the DMRS-sharing power control configuration; and transmitting second data associated with the second duplex type on the second slot of the set of slots at the fixed transmission power level in accordance with the DMRS-sharing power control configuration.

Clause 19. The method of clause 18, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

Clause 20. The method of any of clauses 18 to 19, wherein the fixed transmission power level is signaled to the UE via one or more scheduled grants from a wireless node.

Clause 21. The method of any of clauses 18 to 20, wherein the first duplex type is half-duplex and the second duplex type is full-duplex.

Clause 22. The method of any of clauses 18 to 21, wherein the first duplex type is full-duplex and the second duplex type is half-duplex.

Clause 23. The method of any of clauses 18 to 22, wherein the duplex configuration associated with the set of slots is based upon a downlink control information (DCI) that schedules multiple slots associated with the first duplex type, multiple slots associated with the second duplex type, or a combination thereof.

Clause 24. A method of operating a wireless node, comprising: transmitting a duplex configuration associated with a set of slots, wherein the duplex configuration comprises a first slot associated with a first duplex type and a second slot associated with a second duplex type; receiving a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration; and receiving a second transmission of second data associated with the second duplex type on the second slot of the set of slots at the fixed transmission power level in accordance with the DMRS-sharing power control configuration.

Clause 25. The method of clause 24, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

Clause 26. The method of any of clauses 24 to 25, wherein the fixed transmission power level is signaled to the UE via one or more scheduled grants from the wireless node.

Clause 27. The method of any of clauses 24 to 26, wherein the first duplex type is half-duplex and the second duplex type is full-duplex.

Clause 28. The method of any of clauses 24 to 27, wherein the first duplex type is full-duplex and the second duplex type is half-duplex.

Clause 29. The method of any of clauses 24 to 28, wherein the duplex configuration associated with the set of slots is based upon a downlink control information (DCI) that schedules multiple slots associated with the first duplex type, multiple slots associated with the second duplex type, or a combination thereof.

Clause 30. The method of any of clauses 24 to 29, wherein the wireless node corresponds to a base station, or wherein the wireless node corresponds to another UE.

Clause 31. A user equipment (UE), comprising: a memory; at least one transceiver; and at least one processor communicatively coupled to the memory and the at least one transceiver, the at least one processor configured to: bundle a set of slots for transmissions in accordance with a demodulation reference signal (DMRS)-sharing power control configuration that maintains phase continuity by sharing DMRS to fix transmission power for the transmissions across the set of slots; determine a first transmission power level for a first transmission of first data associated with a first duplex type on a first slot of the set of slots in accordance with the DMRS-sharing power control configuration; determine to exclude a second transmission of second data associated with a second duplex type on a second slot of the set of slots from the DMRS-sharing power control configuration based at least in part upon the first transmission power level; transmit, via the at least one transceiver, the first data associated with the first duplex type on the first slot at the first transmission power level in accordance with the DMRS-sharing power control configuration; and transmit, via the at least one transceiver, the second data associated with the second duplex type on the second slot at a second transmission power level that is different than the first transmission power level.

Clause 32. The UE of clause 31, wherein the first duplex type is half-duplex and the second duplex type is full-duplex.

Clause 33. The UE of clause 32, wherein the determination to exclude the second transmission from the DMRS-sharing power control configuration is in response to the first transmission power level being greater than the second transmission power level.

Clause 34. The UE of any of clauses 32 to 33, wherein the at least one processor is further configured to: transmit, via the at least one transceiver, an indication that full-duplex transmissions during the set of slots are excluded from the DMRS-sharing power control configuration.

Clause 35. The UE of any of clauses 31 to 34, wherein the first duplex type is full-duplex and the second duplex type is half-duplex.

Clause 36. The UE of clause 35, wherein the determination to exclude the second transmission from the DMRS-sharing power control configuration is in response to the first transmission power level being less than the second transmission power level.

Clause 37. The UE of any of clauses 31 to 36, wherein the determination to exclude the second transmission from the DMRS-sharing power control configuration is based on control information signaling from a wireless node.

Clause 38. The UE of any of clauses 31 to 37, wherein the determination to exclude the second transmission from the DMRS-sharing power control configuration is based on a gap between the first slot and the second slot being less than a threshold.

Clause 39. A wireless node, comprising: a memory; at least one transceiver; and at least one processor communicatively coupled to the memory and the at least one transceiver, the at least one processor configured to: receive, via the at least one transceiver, a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots; receive, via the at least one transceiver, a second transmission of second data associated with a second duplex type on a second slot of a set of slots, wherein the second data is transmitted by the UE at a second transmission power level; and determine that the second data is excluded from the DMRS-sharing power control configuration.

Clause 40. The wireless node of clause 39, wherein the determination that the second transmission is excluded from the DMRS-sharing power control configuration is based on a differential between a first pathloss associated with the first transmission and a second pathloss associated with the second transmission, or wherein the determination that the second transmission is excluded from the DMRS-sharing power control configuration is based on an indication from the UE, or wherein the determination that the second transmission is excluded from the DMRS-sharing power control configuration originates at the wireless node and is signaled to the UE.

Clause 41. The wireless node of any of clauses 39 to 40, wherein the first duplex type is half-duplex and the second duplex type is full-duplex.

Clause 42. The wireless node of clause 41, wherein the determination that the second transmission is excluded from the DMRS-sharing power control configuration is in response to the first transmission power level being greater than the second transmission power level.

Clause 43. The wireless node of any of clauses 41 to 42, wherein the at least one processor is further configured to: receive, via the at least one transceiver, an indication that full-duplex transmissions during the set of slots are excluded from the DMRS-sharing power control configuration.

Clause 44. The wireless node of any of clauses 39 to 43, wherein the first duplex type is full-duplex and the second duplex type is half-duplex.

Clause 45. The wireless node of clause 44, wherein the determination that the second transmission is excluded from the DMRS-sharing power control configuration is in response to the first transmission power level being less than the second transmission power level.

Clause 46. The wireless node of any of clauses 39 to 45, wherein the determination that the second transmission is excluded from the DMRS-sharing power control configuration is based on a gap between the first slot and the second slot being less than a threshold.

Clause 47. The wireless node of any of clauses 39 to 46, wherein the wireless node corresponds to a base station, or wherein the wireless node corresponds to another UE.

Clause 48. An UE, comprising: a memory; at least one transceiver; and at least one processor communicatively coupled to the memory and the at least one transceiver, the at least one processor configured to: receive, via the at least one transceiver, a duplex configuration associated with a set of slots, wherein the duplex configuration comprises a first slot associated with a first duplex type and a second slot associated with a second duplex type; determine a fixed transmission power level for a demodulation reference signal (DMRS)-sharing power control configuration that is based at least in part upon the duplex configuration; bundle the set of slots for transmissions in accordance with the DMRS-sharing power control configuration that maintains phase continuity by sharing DMRS to fix transmission power at the fixed transmission power level for the transmissions across the set of slots; transmit, via the at least one transceiver, first data associated with the first duplex type on the first slot of the set of slots at the fixed transmission power level in accordance with the DMRS-sharing power control configuration; and transmit, via the at least one transceiver, second data associated with the second duplex type on the second slot of the set of slots at the fixed transmission power level in accordance with the DMRS-sharing power control configuration.

Clause 49. The UE of clause 48, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

Clause 50. The UE of any of clauses 48 to 49, wherein the fixed transmission power level is signaled to the UE via one or more scheduled grants from a wireless node.

Clause 51. The UE of any of clauses 48 to 50, wherein the first duplex type is half-duplex and the second duplex type is full-duplex.

Clause 52. The UE of any of clauses 48 to 51, wherein the first duplex type is full-duplex and the second duplex type is half-duplex.

Clause 53. The UE of any of clauses 48 to 52, wherein the duplex configuration associated with the set of slots is based upon a downlink control information (DCI) that schedules multiple slots associated with the first duplex type, multiple slots associated with the second duplex type, or a combination thereof.

Clause 54. A wireless node, comprising: a memory; at least one transceiver; and at least one processor communicatively coupled to the memory and the at least one transceiver, the at least one processor configured to: transmit, via the at least one transceiver, a duplex configuration associated with a set of slots, wherein the duplex configuration comprises a first slot associated with a first duplex type and a second slot associated with a second duplex type; receive, via the at least one transceiver, a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration; and receive, via the at least one transceiver, a second transmission of second data associated with the second duplex type on the second slot of the set of slots at the fixed transmission power level in accordance with the DMRS-sharing power control configuration.

Clause 55. The wireless node of clause 54, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

Clause 56. The wireless node of any of clauses 54 to 55, wherein the fixed transmission power level is signaled to the UE via one or more scheduled grants from the wireless node.

Clause 57. The wireless node of any of clauses 54 to 56, wherein the first duplex type is half-duplex and the second duplex type is full-duplex.

Clause 58. The wireless node of any of clauses 54 to 57, wherein the first duplex type is full-duplex and the second duplex type is half-duplex.

Clause 59. The wireless node of any of clauses 54 to 58, wherein the duplex configuration associated with the set of slots is based upon a downlink control information (DCI) that schedules multiple slots associated with the first duplex type, multiple slots associated with the second duplex type, or a combination thereof.

Clause 60. The wireless node of any of clauses 54 to 59, wherein the wireless node corresponds to a base station, or wherein the wireless node corresponds to another UE.

Clause 61. A user equipment (UE), comprising: means for bundling a set of slots for transmissions in accordance with a demodulation reference signal (DMRS)-sharing power control configuration that maintains phase continuity by sharing DMRS to fix transmission power for the transmissions across the set of slots; means for determining a first transmission power level for a first transmission of first data associated with a first duplex type on a first slot of the set of slots in accordance with the DMRS-sharing power control configuration; means for determining to exclude a second transmission of second data associated with a second duplex type on a second slot of the set of slots from the DMRS-sharing power control configuration based at least in part upon the first transmission power level; means for transmitting the first data associated with the first duplex type on the first slot at the first transmission power level in accordance with the DMRS-sharing power control configuration; and means for transmitting the second data associated with the second duplex type on the second slot at a second transmission power level that is different than the first transmission power level.

Clause 62. The UE of clause 61, wherein the first duplex type is half-duplex and the second duplex type is full-duplex.

Clause 63. The UE of clause 62, wherein the determination to exclude the second transmission from the DMRS-sharing power control configuration is in response to the first transmission power level being greater than the second transmission power level.

Clause 64. The UE of any of clauses 62 to 63, further comprising: means for transmitting an indication that full-duplex transmissions during the set of slots are excluded from the DMRS-sharing power control configuration.

Clause 65. The UE of any of clauses 61 to 64, wherein the first duplex type is full-duplex and the second duplex type is half-duplex.

Clause 66. The UE of clause 65, wherein the determination to exclude the second transmission from the DMRS-sharing power control configuration is in response to the first transmission power level being less than the second transmission power level.

Clause 67. The UE of any of clauses 61 to 66, wherein the determination to exclude the second transmission from the DMRS-sharing power control configuration is based on control information signaling from a wireless node.

Clause 68. The UE of any of clauses 61 to 67, wherein the determination to exclude the second transmission from the DMRS-sharing power control configuration is based on a gap between the first slot and the second slot being less than a threshold.

Clause 69. A wireless node, comprising: means for receiving a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots;

means for receiving a second transmission of second data associated with a second duplex type on a second slot of a set of slots, wherein the second data is transmitted by the UE at a second transmission power level; and means for determining that the second data is excluded from the DMRS-sharing power control configuration.

Clause 70. The wireless node of clause 69, wherein the determination that the second transmission is excluded from the DMRS-sharing power control configuration is based on a differential between a first pathloss associated with the first transmission and a second pathloss associated with the second transmission, or wherein the determination that the second transmission is excluded from the DMRS-sharing power control configuration is based on an indication from the UE, or wherein the determination that the second transmission is excluded from the DMRS-sharing power control configuration originates at the wireless node and is signaled to the UE.

Clause 71. The wireless node of any of clauses 69 to 70, wherein the first duplex type is half-duplex and the second duplex type is full-duplex.

Clause 72. The wireless node of clause 71, wherein the determination that the second transmission is excluded from the DMRS-sharing power control configuration is in response to the first transmission power level being greater than the second transmission power level.

Clause 73. The wireless node of any of clauses 71 to 72, further comprising: means for receiving an indication that full-duplex transmissions during the set of slots are excluded from the DMRS-sharing power control configuration.

Clause 74. The wireless node of any of clauses 69 to 73, wherein the first duplex type is full-duplex and the second duplex type is half-duplex.

Clause 75. The wireless node of clause 74, wherein the determination that the second transmission is excluded from the DMRS-sharing power control configuration is in response to the first transmission power level being less than the second transmission power level.

Clause 76. The wireless node of any of clauses 69 to 75, wherein the determination that the second transmission is excluded from the DMRS-sharing power control configuration is based on a gap between the first slot and the second slot being less than a threshold.

Clause 77. The wireless node of any of clauses 69 to 76, wherein the wireless node corresponds to a base station, or wherein the wireless node corresponds to another UE.

Clause 78. An UE, comprising: means for receiving a duplex configuration associated with a set of slots, wherein the duplex configuration comprises a first slot associated with a first duplex type and a second slot associated with a second duplex type; means for determining a fixed transmission power level for a demodulation reference signal (DMRS)-sharing power control configuration that is based at least in part upon the duplex configuration; means for bundling the set of slots for transmissions in accordance with the DMRS-sharing power control configuration that maintains phase continuity by sharing DMRS to fix transmission power at the fixed transmission power level for the transmissions across the set of slots; means for transmitting first data associated with the first duplex type on the first slot of the set of slots at the fixed transmission power level in accordance with the DMRS-sharing power control configuration; and means for transmitting second data associated with the second duplex type on the second slot of the set of slots at the fixed transmission power level in accordance with the DMRS-sharing power control configuration.

Clause 79. The UE of clause 78, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

Clause 80. The UE of any of clauses 78 to 79, wherein the fixed transmission power level is signaled to the UE via one or more scheduled grants from a wireless node.

Clause 81. The UE of any of clauses 78 to 80, wherein the first duplex type is half-duplex and the second duplex type is full-duplex.

Clause 82. The UE of any of clauses 78 to 81, wherein the first duplex type is full-duplex and the second duplex type is half-duplex.

Clause 83. The UE of any of clauses 78 to 82, wherein the duplex configuration associated with the set of slots is based upon a downlink control information (DCI) that schedules multiple slots associated with the first duplex type, multiple slots associated with the second duplex type, or a combination thereof.

Clause 84. A wireless node, comprising: means for transmitting a duplex configuration associated with a set of slots, wherein the duplex configuration comprises a first slot associated with a first duplex type and a second slot associated with a second duplex type; means for receiving a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration; and means for receiving a second transmission of second data associated with the second duplex type on the second slot of the set of slots at the fixed transmission power level in accordance with the DMRS-sharing power control configuration.

Clause 85. The wireless node of clause 84, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

Clause 86. The wireless node of any of clauses 84 to 85, wherein the fixed transmission power level is signaled to the UE via one or more scheduled grants from the wireless node.

Clause 87. The wireless node of any of clauses 84 to 86, wherein the first duplex type is half-duplex and the second duplex type is full-duplex.

Clause 88. The wireless node of any of clauses 84 to 87, wherein the first duplex type is full-duplex and the second duplex type is half-duplex.

Clause 89. The wireless node of any of clauses 84 to 88, wherein the duplex configuration associated with the set of slots is based upon a downlink control information (DCI) that schedules multiple slots associated with the first duplex type, multiple slots associated with the second duplex type, or a combination thereof.

Clause 90. The wireless node of any of clauses 84 to 89, wherein the wireless node corresponds to a base station, or wherein the wireless node corresponds to another UE.

Clause 91. A non-transitory computer-readable medium storing computer-executable instructions that, when executed by a user equipment (UE), cause the UE to: bundle a set of slots for transmissions in accordance with a demodulation reference signal (DMRS)-sharing power control configuration that maintains phase continuity by sharing DMRS to fix transmission power for the transmissions across the set of slots; determine a first transmission power level for a first transmission of first data associated with a first duplex type on a first slot of the set of slots in accordance with the DMRS-sharing power control configuration; determine to exclude a second transmission of second data associated with a second duplex type on a second slot of the set of slots from the DMRS-sharing power control configuration based at least in part upon the first transmission power level; transmit the first data associated with the first duplex type on the first slot at the first transmission power level in accordance with the DMRS-sharing power control configuration; and transmit the second data associated with the second duplex type on the second slot at a second transmission power level that is different than the first transmission power level.

Clause 92. The non-transitory computer-readable medium of clause 91, wherein the first duplex type is half-duplex and the second duplex type is full-duplex.

Clause 93. The non-transitory computer-readable medium of clause 92, wherein the determination to exclude the second transmission from the DMRS-sharing power control configuration is in response to the first transmission power level being greater than the second transmission power level.

Clause 94. The non-transitory computer-readable medium of any of clauses 92 to 93, further comprising computer-executable instructions that, when executed by the UE, cause the UE to: transmit an indication that full-duplex transmissions during the set of slots are excluded from the DMRS-sharing power control configuration.

Clause 95. The non-transitory computer-readable medium of any of clauses 91 to 94, wherein the first duplex type is full-duplex and the second duplex type is half-duplex.

Clause 96. The non-transitory computer-readable medium of clause 95, wherein the determination to exclude the second transmission from the DMRS-sharing power control configuration is in response to the first transmission power level being less than the second transmission power level.

Clause 97. The non-transitory computer-readable medium of any of clauses 91 to 96, wherein the determination to exclude the second transmission from the DMRS-sharing power control configuration is based on control information signaling from a wireless node.

Clause 98. The non-transitory computer-readable medium of any of clauses 91 to 97, wherein the determination to exclude the second transmission from the DMRS-sharing power control configuration is based on a gap between the first slot and the second slot being less than a threshold.

Clause 99. A non-transitory computer-readable medium storing computer-executable instructions that, when executed by a wireless node, cause the wireless node to: receive a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots; receive a second transmission of second data associated with a second duplex type on a second slot of a set of slots, wherein the second data is transmitted by the UE at a second transmission power level; and determine that the second data is excluded from the DMRS-sharing power control configuration.

Clause 100. The non-transitory computer-readable medium of clause 99, wherein the determination that the second transmission is excluded from the DMRS-sharing power control configuration is based on a differential between a first pathloss associated with the first transmission and a second pathloss associated with the second transmission, or wherein the determination that the second transmission is excluded from the DMRS-sharing power control configuration is based on an indication from the UE, or wherein the determination that the second transmission is excluded from the DMRS-sharing power control configuration originates at the wireless node and is signaled to the UE.

Clause 101. The non-transitory computer-readable medium of any of clauses 99 to 100, wherein the first duplex type is half-duplex and the second duplex type is full-duplex.

Clause 102. The non-transitory computer-readable medium of clause 101, wherein the determination that the second transmission is excluded from the DMRS-sharing power control configuration is in response to the first transmission power level being greater than the second transmission power level.

Clause 103. The non-transitory computer-readable medium of any of clauses 101 to 102, further comprising computer-executable instructions that, when executed by the wireless node, cause the wireless node to: receive an indication that full-duplex transmissions during the set of slots are excluded from the DMRS-sharing power control configuration.

Clause 104. The non-transitory computer-readable medium of any of clauses 99 to 103, wherein the first duplex type is full-duplex and the second duplex type is half-duplex.

Clause 105. The non-transitory computer-readable medium of clause 104, wherein the determination that the second transmission is excluded from the DMRS-sharing power control configuration is in response to the first transmission power level being less than the second transmission power level.

Clause 106. The non-transitory computer-readable medium of any of clauses 99 to 105, wherein the determination that the second transmission is excluded from the DMRS-sharing power control configuration is based on a gap between the first slot and the second slot being less than a threshold.

Clause 107. The non-transitory computer-readable medium of any of clauses 99 to 106, wherein the wireless node corresponds to a base station, or wherein the wireless node corresponds to another UE.

Clause 108. A non-transitory computer-readable medium storing computer-executable instructions that, when executed by an UE, cause the UE to: receive a duplex configuration associated with a set of slots, wherein the duplex configuration comprises a first slot associated with a first duplex type and a second slot associated with a second duplex type; determine a fixed transmission power level for a demodulation reference signal (DMRS)-sharing power control configuration that is based at least in part upon the duplex configuration; bundle the set of slots for transmissions in accordance with the DMRS-sharing power control configuration that maintains phase continuity by sharing DMRS to fix transmission power at the fixed transmission power level for the transmissions across the set of slots; transmit first data associated with the first duplex type on the first slot of the set of slots at the fixed transmission power level in accordance with the DMRS-sharing power control configuration; and transmit second data associated with the second duplex type on the second slot of the set of slots at the fixed transmission power level in accordance with the DMRS-sharing power control configuration.

Clause 109. The non-transitory computer-readable medium of clause 108, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

Clause 110. The non-transitory computer-readable medium of any of clauses 108 to 109, wherein the fixed transmission power level is signaled to the UE via one or more scheduled grants from a wireless node.

Clause 111. The non-transitory computer-readable medium of any of clauses 108 to 110, wherein the first duplex type is half-duplex and the second duplex type is full-duplex.

Clause 112. The non-transitory computer-readable medium of any of clauses 108 to 111, wherein the first duplex type is full-duplex and the second duplex type is half-duplex.

Clause 113. The non-transitory computer-readable medium of any of clauses 108 to 112, wherein the duplex configuration associated with the set of slots is based upon a downlink control information (DCI) that schedules multiple slots associated with the first duplex type, multiple slots associated with the second duplex type, or a combination thereof.

Clause 114. A non-transitory computer-readable medium storing computer-executable instructions that, when executed by a wireless node, cause the wireless node to: transmit a duplex configuration associated with a set of slots, wherein the duplex configuration comprises a first slot associated with a first duplex type and a second slot associated with a second duplex type; receive a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration; and receive a second transmission of second data associated with the second duplex type on the second slot of the set of slots at the fixed transmission power level in accordance with the DMRS-sharing power control configuration.

Clause 115. The non-transitory computer-readable medium of clause 114, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

Clause 116. The non-transitory computer-readable medium of any of clauses 114 to 115, wherein the fixed transmission power level is signaled to the UE via one or more scheduled grants from the wireless node.

Clause 117. The non-transitory computer-readable medium of any of clauses 114 to 116, wherein the first duplex type is half-duplex and the second duplex type is full-duplex.

Clause 118. The non-transitory computer-readable medium of any of clauses 114 to 117, wherein the first duplex type is full-duplex and the second duplex type is half-duplex.

Clause 119. The non-transitory computer-readable medium of any of clauses 114 to 118, wherein the duplex configuration associated with the set of slots is based upon a downlink control information (DCI) that schedules multiple slots associated with the first duplex type, multiple slots associated with the second duplex type, or a combination thereof.

Clause 120. The non-transitory computer-readable medium of any of clauses 114 to 119, wherein the wireless node corresponds to a base station, or wherein the wireless node corresponds to another UE.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a memory;
at least one transceiver; and
at least one processor communicatively coupled to the memory and the at least one transceiver, the at least one processor configured to:
bundle a set of slots for transmissions in accordance with a demodulation reference signal (DMRS)-sharing power control configuration that maintains phase continuity by sharing DMRS to fix transmission power for the transmissions across the set of slots;

determine a first transmission power level for a first transmission of first data associated with a first duplex type on a first slot of the set of slots in accordance with the DMRS-sharing power control configuration;
determine to exclude a second transmission of second data associated with a second duplex type on a second slot of the set of slots from the DMRS-sharing power control configuration based at least in part upon the first transmission power level;
transmit the first data associated with the first duplex type on the first slot at the first transmission power level in accordance with the DMRS-sharing power control configuration; and
transmit the second data associated with the second duplex type on the second slot at a second transmission power level that is different than the first transmission power level.

2. The UE of claim 1, wherein the first duplex type is half-duplex and the second duplex type is full-duplex.

3. The UE of claim 2, wherein the determination to exclude the second transmission from the DMRS-sharing power control configuration is in response to the first transmission power level being greater than the second transmission power level.

4. The UE of claim 2, wherein the at least one processor is further configured to:
transmit, via the at least one transceiver, an indication that full-duplex transmissions during the set of slots are excluded from the DMRS-sharing power control configuration.

5. The UE of claim 1, wherein the first duplex type is full-duplex and the second duplex type is half-duplex.

6. The UE of claim 5, wherein the determination to exclude the second transmission from the DMRS-sharing power control configuration is in response to the first transmission power level being less than the second transmission power level.

7. The UE of claim 1, wherein the determination to exclude the second transmission from the DMRS-sharing power control configuration is based on control information signaling from a wireless node.

8. The UE of claim 1, wherein the determination to exclude the second transmission from the DMRS-sharing power control configuration is based on a gap between the first slot and the second slot being less than a threshold.

9. A wireless node, comprising:
a memory;
at least one transceiver; and
at least one processor communicatively coupled to the memory and the at least one transceiver, the at least one processor configured to:
receive, via the at least one transceiver, a first transmission of first data associated with a first duplex type on a first slot of a set of slots, wherein the first data is transmitted by a user equipment (UE) at a first transmission power level in accordance with a demodulation reference signal (DMRS)-sharing power control configuration that maintains phase continuity by sharing DMRS to fix transmission power for transmissions across the set of slots;
receive, via the at least one transceiver, a second transmission of second data associated with a second duplex type on a second slot of a set of slots, wherein the second data is transmitted by the UE at a second transmission power level; and
determine that the second data is excluded from the DMRS-sharing power control configuration.

10. The wireless node of claim 9, wherein the determination that the second transmission is excluded from the DMRS-sharing power control configuration is based on a differential between a first pathloss associated with the first transmission and a second pathloss associated with the second transmission, or wherein the determination that the second transmission is excluded from the DMRS-sharing power control configuration is based on an indication from the UE, or wherein the determination that the second transmission is excluded from the DMRS-sharing power control configuration originates at the wireless node and is signaled to the UE.

11. The wireless node of claim 9, wherein the first duplex type is half-duplex and the second duplex type is full-duplex.

12. The wireless node of claim 11, wherein the determination that the second transmission is excluded from the DMRS-sharing power control configuration is in response to the first transmission power level being greater than the second transmission power level.

13. The wireless node of claim 11, wherein the at least one processor is further configured to:

receive, via the at least one transceiver, an indication that full-duplex transmissions during the set of slots are excluded from the DMRS-sharing power control configuration.

14. The wireless node of claim 9, wherein the first duplex type is full-duplex and the second duplex type is half-duplex.

15. The wireless node of claim 14, wherein the determination that the second transmission is excluded from the DMRS-sharing power control configuration is in response to the first transmission power level being less than the second transmission power level.

16. The wireless node of claim 9, wherein the determination that the second transmission is excluded from the DMRS-sharing power control configuration is based on a gap between the first slot and the second slot being less than a threshold.

17. The wireless node of claim 9, wherein the wireless node corresponds to a base station, or wherein the wireless node corresponds to another UE.

18. A user equipment (UE), comprising:

a memory;

at least one transceiver; and at least one processor communicatively coupled to the memory and the at least one transceiver, the at least one processor configured to:

receive, via the at least one transceiver, a duplex configuration associated with a set of slots, wherein the duplex configuration comprises a first slot associated with a first duplex type and a second slot associated with a second duplex type;

determine a fixed transmission power level for a demodulation reference signal (DMRS)-sharing power control configuration that is based at least in part upon the duplex configuration;

bundle the set of slots for transmissions in accordance with the DMRS-sharing power control configuration that maintains phase continuity by sharing DMRS to fix transmission power at the fixed transmission power level for the transmissions across the set of slots;

transmit first data associated with the first duplex type on the first slot of the set of slots at the fixed transmission power level in accordance with the DMRS-sharing power control configuration; and transmit second data associated with the second duplex type on the second slot of the set of slots at the fixed transmission power level in accordance with the DMRS-sharing power control configuration.

19. The UE of claim 18, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

20. The UE of claim 18, wherein the fixed transmission power level is signaled to the UE via one or more scheduled grants from a wireless node.

21. The UE of claim 18, wherein the first duplex type is half-duplex and the second duplex type is full-duplex.

22. The UE of claim 18, wherein the first duplex type is full-duplex and the second duplex type is half-duplex.

23. The UE of claim 18, wherein the duplex configuration associated with the set of slots is based upon a downlink control information (DCI) that schedules multiple slots associated with the first duplex type, multiple slots associated with the second duplex type, or a combination thereof.

24. A wireless node, comprising:

a memory;

at least one transceiver; and at least one processor communicatively coupled to the memory and the at least one transceiver, the at least one processor configured to:

transmit, via the at least one transceiver, a duplex configuration associated with a set of slots, wherein the duplex configuration comprises a first slot associated with a first duplex type and a second slot associated with a second duplex type;

receive, via the at least one transceiver, a first transmission of first data associated with the first duplex type on the first slot of a set of slots, wherein the first transmission is transmitted by a user equipment (UE) at a fixed transmission power level in accordance with a demodulation reference signal (DMRS)-sharing power control configuration that maintains phase continuity by sharing DMRS to fix transmission power for the transmissions across the set of slots, wherein the fixed transmission power level for the DMRS-sharing power control configuration is based at least in part upon the duplex configuration; and receive, via the at least one transceiver, a second transmission of second data associated with the second duplex type on the second slot of the set of slots at the fixed transmission power level in accordance with the DMRS-sharing power control configuration.

25. The wireless node of claim 24, wherein the fixed transmission power level is based on both half-duplex transmissions on the first set of slots and full-duplex transmissions on the first set of slots, or wherein the fixed transmission power level is based only on the half-duplex transmissions on the first set of slots, or wherein the fixed transmission power level is based only on the full-duplex transmissions on the first set of slots.

26. The wireless node of claim 24, wherein the fixed transmission power level is signaled to the UE via one or more scheduled grants from the wireless node.

27. The wireless node of claim 24, wherein the first duplex type is half-duplex and the second duplex type is full-duplex.

28. The wireless node of claim 24, wherein the first duplex type is full-duplex and the second duplex type is half-duplex.

29. The wireless node of claim 24, wherein the duplex configuration associated with the set of slots is based upon a downlink control information (DCI) that schedules multiple slots associated with the first duplex type, multiple slots associated with the second duplex type, or a combination thereof.

30. The wireless node of claim 24,
wherein the wireless node corresponds to a base station, or
wherein the wireless node corresponds to another UE.

* * * * *